US011308814B2

(12) United States Patent
Fujii et al.

(10) Patent No.: US 11,308,814 B2
(45) Date of Patent: Apr. 19, 2022

(54) HAPS COOPERATIVE FLIGHT SYSTEM

(71) Applicant: SoftBank Corp., Tokyo (JP)

(72) Inventors: Takafumi Fujii, Tokyo (JP); Yoshichika Ota, Tokyo (JP); Kenji Hoshino, Tokyo (JP)

(73) Assignee: SoftBank Corp., Tokyo (JP)

( * ) Notice: Subject to any disclaimer, the term of this patent is extended or adjusted under 35 U.S.C. 154(b) by 0 days.

(21) Appl. No.: 16/966,254

(22) PCT Filed: Jan. 22, 2019

(86) PCT No.: PCT/JP2019/001917
§ 371 (c)(1),
(2) Date: Jul. 30, 2020

(87) PCT Pub. No.: WO2019/155872
PCT Pub. Date: Aug. 15, 2019

(65) Prior Publication Data
US 2020/0380874 A1  Dec. 3, 2020

(30) Foreign Application Priority Data

Feb. 6, 2018 (JP) .............................. JP2018-018968

(51) Int. Cl.
*G08G 5/00* (2006.01)
*H04B 7/155* (2006.01)

(52) U.S. Cl.
CPC ......... *G08G 5/0013* (2013.01); *G08G 5/0026* (2013.01); *G08G 5/0043* (2013.01); *H04B 7/1555* (2013.01)

(58) Field of Classification Search
CPC .. G08G 5/0013; G08G 5/0026; G08G 5/0043; H04B 7/1555
See application file for complete search history.

(56) References Cited

U.S. PATENT DOCUMENTS 9,836,049 B1    12/2017  Tu
9,973,261 B1 *   5/2018  Hardy ................ H04B 7/18523
(Continued)

FOREIGN PATENT DOCUMENTS

CN    108028011 A    5/2018
CN    108668257 A   10/2018
(Continued)

OTHER PUBLICATIONS

Lte, Arib, "Evolved Universal Terrestrial Radio Access (E-UTRA) and Evolved Universal Terrestrial Radio Access Network (E-UTRAN)", 3GPP TS 36.300, ARIB STD-T104-36.300, V10.12.0, Overall description, Stage 2, Release 10, Dec. 2014.
(Continued)

*Primary Examiner* — Michael D Lang
(74) *Attorney, Agent, or Firm* — Muirhead and Saturnelli, LLC

(57) ABSTRACT

A system and a method for suppressing a deterioration of communication quality due to frequent occurrence of handovers at cell boundaries of a plurality of cells formed by a plurality of radio relay apparatuses that can move in an upper airspace, are provided. In the system, each of the plurality of radio relay apparatuses for performing a radio communication with a terminal apparatus comprises a radio relay station which is movably provided by flying in an upper airspace, forms a cell toward the ground or the sea, and performs a radio communication with a terminal apparatus located in the cell. Each of the plurality of radio relay apparatuses flies in cooperation with each other so as to maintain a positional relationship between the radio relay apparatuses by an autonomous control or external control.

20 Claims, 22 Drawing Sheets

(56) References Cited

U.S. PATENT DOCUMENTS

2003/0236070 A1  12/2003  Seligsohn et al.
2015/0236778 A1   8/2015  Jalali
2017/0063445 A1   3/2017  Feria et al.

FOREIGN PATENT DOCUMENTS

| CN | 109104235 A | 12/2018 |
| JP | 2002-159055 A | 5/2002 |
| JP | 2004-336408 A | 11/2004 |
| JP | 2014-091335 A | 5/2014 |
| JP | 2016-219874 A | 12/2016 |
| WO | 2017/019595 A1 | 2/2017 |
| WO | WO 2017/019595 A1 | 2/2017 |

OTHER PUBLICATIONS

Lte, "3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN)," 3GPP TS 36.300, V13.5.0, Overall description, State 2, Release 13, Sep. 2016.

Giovanni Romano, 3GPP RAN, "3GPP RAN progress on "5G"," TIM, 2016.

Naser Hossein Motlagh, et al., "Low-Altitude Unmanned Aerial Vehicles-Based Internet of Things Services: Comprehensive Survey and Future Perspectives," IEEE Internet of Things Journal, vol. 3, No. 6, Dec. 2016.

Naser Hossein Motlagh, et al., "Low-Altitude Unmanned Aerial Vehicles-Based Internet of Things Services: Comprehensize Survey and Future Perspectives," IEEE Internet of Things Journal, vol. 3, No. 6, Dec. 2016.

\* cited by examiner

DURING STRONG WIND

DURING MILD WIND

DURING ALMOST NO WIND

HAPS COOPERATIVE FLIGHT SYSTEM

TECHNICAL FIELD

The present invention relates to a system and a method for controlling a flight of a radio relay apparatus such as a HAPS (High Altitude Platform Station) suitable for constructing a three-dimensional network for fifth generation communication.

BACKGROUND ART

There is conventionally known a communication standard called LTE-Advanced Pro (see Non-Patent Literature 2), which is an extension of LTE (Long Term Evolution)-Advanced (see Non-Patent Literature 1) of 3GPP, which is a communication standard for mobile communication systems. In this LTE-Advanced Pro, specifications have been established for providing a communication to recent devices for IoT (Internet of Things). Furthermore, a fifth-generation mobile communication, which supports simultaneous connection to a large number of terminal apparatuses (also referred to as "UE (user equipment)", "mobile station", and "communication terminal") such as devices for IoT, and low delay, is under study (for example, see Non-Patent Literature 3).

CITATION LIST

Non-Patent Literature

Non-Patent Literature 1: 3GPP TS 36.300 V10.12.0 (2014-12).
Non-Patent Literature 2: 3GPP TS 36.300 V13.5.0 (2016-09).
Non-Patent Literature 3: G. Romano, "3GPP RAN progress on "5G"", 3GPP, 2016.

SUMMARY OF INVENTION

Technical Problem

In the fifth-generation mobile communication and the like, in the case of arranging a plurality of radio relay apparatuses that can move in an upper airspace so as to realize a three-dimensional network by a radio communication with a terminal apparatus including a device for IoT, a communication quality may be deteriorated due to frequent occurrence of handovers at cell boundaries of a plurality of cells formed by the plurality of radio relay apparatuses, or increase in interference from adjacent cells.

Solution to Problem

In order to solve the problem, a system according to an aspect of the present invention comprises a plurality of radio relay apparatuses for performing a radio communication with a terminal apparatus. Each of the plurality of radio relay apparatuses is movably provided by flying in an upper airspace, comprises a radio relay station for forming a cell toward the ground or the sea to perform a radio communication with a terminal apparatus located in the cell, and flies in cooperation with each other so as to maintain a positional relationship between the radio relay apparatuses by an autonomous control or external control.

In the foregoing system, each of the plurality of radio relay apparatuses may perform a cooperative flight that maintains a positional relationship between the radio relay apparatuses in a horizontal direction.

In the foregoing system, each of the plurality of radio relay apparatuses may perform a cooperative flight that maintains a positional relationship between the radio relay apparatuses in a height direction.

In the foregoing system, each of the plurality of radio relay apparatuses may perform a cooperative flight so that a flight direction of the radio relay apparatus and an attitude with respect to the flight direction are the same among the radio relay apparatuses each other.

In the foregoing system, when a flight pattern of any one radio relay apparatus of the plurality of radio relay apparatuses changes, other radio relay apparatus may be controlled to fly in same flight pattern as the changed flight pattern of the any one radio relay apparatus.

In the foregoing system, the plurality of radio relay apparatuses may be classified into a plurality of groups corresponding to plural areas different from each other on the ground or on the sea based on a position of each radio relay apparatus, and the system may control a cooperative flight of the radio relay apparatuses for each group.

In the foregoing system, the cooperative flight of all the plurality of radio relay apparatuses may be controlled, by setting any one radio relay apparatus of the plurality of radio relay apparatuses as a radio relay apparatus serving as a reference for controlling the flight, and controlling the flight of the other radio relay apparatuses so as to fly in cooperation with the reference radio relay apparatus centered on the reference radio relay apparatus.

In the foregoing system, a management apparatus for managing the plurality of radio relay apparatuses may be provided. The management apparatus may acquire information including at least one of a current position, an altitude, and an attitude of each of the plurality of radio relay apparatuses, from each of the plurality of radio relay apparatuses via a gateway station on the ground or on the sea, and may transmit control information for performing the cooperative flight to each of the plurality of radio relay apparatuses via the gateway station, based on the information on the radio relay apparatus.

In the foregoing system, a management apparatus for managing the plurality of radio relay apparatuses may be provided, and any one of the plurality of radio relay apparatuses may acquire information including at least one of a current position, an altitude, and an attitude of each of the other radio relay apparatuses, from the other radio relay apparatuses. The management apparatus may acquire information including at least one of a current position, an altitude and an attitude of each of the plurality of radio relay apparatuses, from the any one radio relay apparatus via a gateway station on the ground or on the sea, may transmit control information for performing the cooperative flight to the any one radio relay apparatus via the gateway station, and may transmit the control information to the other radio relay apparatuses via the gateway station and the any one radio relay apparatus, based on the information on the radio relay apparatus.

Furthermore, another system is the foregoing system, in which the radio relay apparatus acquires information including at least one of a current position, an altitude, and an attitude of another radio relay apparatus located near the radio relay apparatus, from the another radio relay apparatus, and controls to fly in cooperation with the another radio relay apparatus based on the information on the radio relay apparatus.

A radio relay apparatus according to another aspect of the present invention is a radio relay apparatus for performing a radio communication with a terminal apparatus. The radio relay apparatus is movably provided by flying in an upper airspace, comprises a radio relay station for forming a cell toward the ground or the sea to perform a radio communication with a terminal apparatus located in the cell, and flies in cooperation with another radio relay apparatus so as to maintain a positional relationship with the another radio relay apparatus located near the radio relay apparatus by an autonomous control or external control.

A management apparatus according to still another aspect of the present invention is a management apparatus for managing a plurality of radio relay apparatuses that performs a radio communication with a terminal apparatus. The management apparatus acquires information including at least one of a current position, an altitude, and an attitude of each of the plurality of radio relay apparatuses that is movably provided by flying in an upper airspace and forms a cell toward the ground or the sea to perform a radio communication with a terminal apparatus located in the cell, from each of the plurality of radio relay apparatuses via a gateway station on the ground or on the sea. The management apparatus transmits control information for a cooperative flight of the plurality of radio relay apparatuses to fly in cooperation with each other so as to maintain a positional relationship between the radio relay apparatuses, to each of the plurality of radio relay apparatuses via the gateway station, based on the information on the plurality of radio relay apparatuses.

A management apparatus according to still another aspect of the present invention is a management apparatus for managing a plurality of radio relay apparatuses of performing a radio communication with a terminal apparatus. The management apparatus acquires information including at least one of a current position, an altitude, and an attitude of each of the plurality of radio relay apparatuses that is movably provided by flying in an upper airspace and forms a cell toward the ground or the sea to perform a radio communication with a terminal apparatus located in the cell, from any one radio relay apparatus of the plurality of radio relay apparatuses via a gateway station on the ground or on the sea. The management apparatus transmits control information for a cooperative flight of the plurality of radio relay apparatuses to fly in cooperation with each other so as to maintain a positional relationship between the radio relay apparatuses, to the any one radio relay apparatus via the gateway station, and transmits the control information to another radio relay apparatus via the gateway station and the any one radio relay apparatus, based on the information on the plurality of radio relay apparatuses.

A method according to still another aspect of the present invention is a flight method of a plurality of radio relay apparatuses of performing a communication with a terminal apparatus. The plurality of radio relay apparatuses, which are movably provided by flying in an upper airspace and respectively form a cell toward the ground or the sea to perform a radio communication with a terminal apparatus located in the cell, fly in cooperation with each other so as to maintain a positional relationship between the radio relay apparatuses by an autonomous control or external control.

Advantageous Effects of Invention

According to the present invention, it is possible to suppress deterioration of a communication quality due to frequent occurrence of handovers at cell boundaries of a plurality of cells formed by a plurality of radio relay apparatuses that can move in an upper airspace, or increase in interference from adjacent cells.

DESCRIPTION OF EMBODIMENTS

Hereinafter, embodiments of the present invention are described with reference to the drawings.

Figure 1:
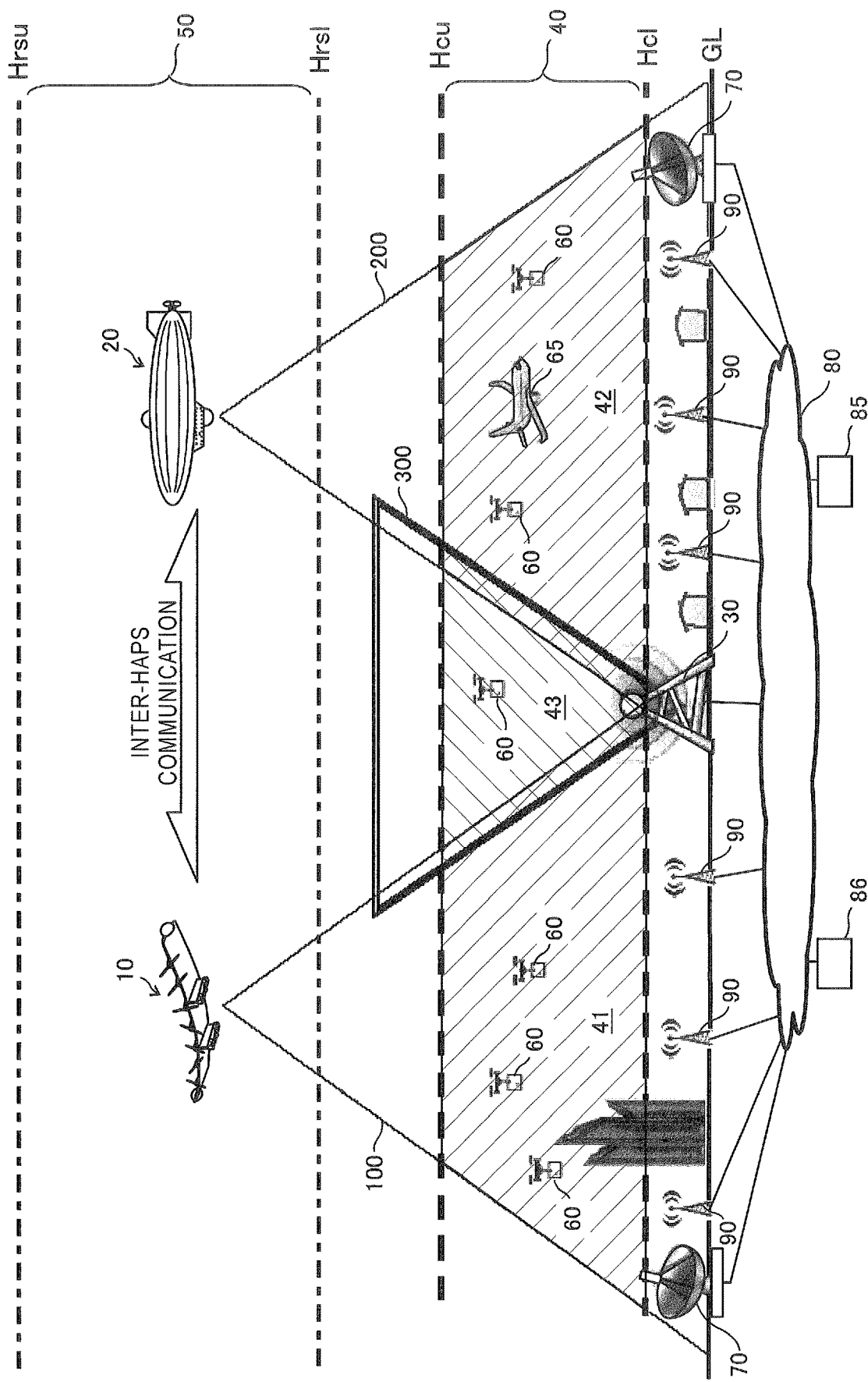
FIG. 1 is a schematic configuration diagram showing an example of an overall configuration of a communication system for realizing a three-dimensional network according to an embodiment of the present invention.

FIG. 1 is a schematic configuration diagram showing an example of an overall configuration of a communication system according to an embodiment of the present invention.

The communication system according to the present embodiment is suitable for realizing a three-dimensional network of the fifth-generation mobile communication corresponding to a simultaneous connection to a large number of terminal apparatuses, low delay method, etc. Moreover, the mobile communication standard applicable to a communication system, a radio relay station, a base station, a repeater, and a terminal apparatus disclosed in the present description, includes a fifth-generation mobile communication standard and next generation mobile communication standards after the fifth generation.

As shown in FIG. 1, the communication system is provided with a plurality of High Altitude Platform Stations (HAPS) (also referred to as "High-Altitude Pseudo Satellite") 10 and 20 as a plurality of communication relay apparatuses (radio relay apparatuses) of an aerial floating type. The HAPSs 10 and 20 are located in an airspace at a predetermined altitude, and form three-dimensional cells (three-dimensional areas) 41 and 42 as indicated by hatching areas in the figure in a cell-formation target airspace 40 at a predetermined altitude. Each of the HAPSs 10 and 20 is a floating object (for example, solar plane, airship) including a radio relay station mounted therein, which is controlled by an autonomous control or an external control so as to be floated or flied and located in an airspace (floating airspace) 50 with high altitude of 100 [km] or less from the ground level or the sea level.

The airspace 50 in which the HAPSs 10 and 20 are located is, for example, a stratospheric airspace with altitude greater than 11 [km] and less than 50 [km]. The airspace 50 may be an airspace with altitude of 15 [km] or more and 25 [km] or less where weather conditions are relatively stable, and may be an airspace with altitude of about 20 [km] in particular. Each of Hrsl and Hrsu in the figure indicates relative altitudes of the lower end and the upper end of the airspace 50 with reference to the ground level (GL), in which the HAPSs 10 and 20 are located.

The cell-formation target airspace 40 is a target airspace for forming a three-dimensional cell with one or two or more HAPSs according to the communication system of the present embodiment. The cell-formation target airspace 40 is an airspace in a predetermined altitude range (for example, altitude range of 50 [m] or more and 1000 [m] or less) located between the airspace 50 where the HAPSs 10 and 20 are located and a cell-formation area near the ground level covered by a base station (for example, LTE eNodeB) 90 such as a conventional macro-cell base station. Each of Hcl and Hcu in the figure indicates relative altitudes of the lower end and the upper end of the cell-formation target airspace 40 with reference to the ground level (GL).

It is noted that, the cell-formation target airspace 40 where the three-dimensional cell of the present embodiment is formed may be an airspace over the sea, a river or a lake.

The radio relay stations of the HAPSs 10 and 20 respectively form beams 100 and 200 for a radio communication with the terminal apparatus that is a mobile station, toward the ground level. The terminal apparatus may be a communication terminal module incorporated in a drone 60 that is an aircraft such as a small helicopter capable of remotely steering, or may be a user apparatus used by a user in the airplane 65. The areas through which the beams 100 and 200 pass in the cell-formation target airspace 40 are three-dimensional cells 41 and 42. The plurality of beams 100 and 200 adjacent to each other in the cell-formation target airspace 40 may be partially overlapped with each other.

Each of the radio relay stations of the HAPSs 10 and 20 is, for example, a base station that wirelessly communicates with a gateway station (also referred to as a "feeder station") 70 as a relay station connected to a core network on the ground (or on the sea) side, or a slave repeater that wirelessly communicates with a feeder station (master repeater) 70 as a relay station connected to a base station on the ground (or on the sea) side. Each of the radio relay stations of the HAPSs 10 and 20 is connected to the core network of the mobile communication network 80 via the feeder station 70 installed on the ground or on the sea. The communication between the HAPSs 10 and 20 and the feeder station 70 may be performed by a radio communication using radio waves such as microwaves, or may be performed by an optical communication using laser light or the like.

Each of the HAPSs 10 and 20 may autonomously control its own floating movement (flight) or a processing at the radio relay station, by executing a control program with a control section including a computer or the like incorporated in the inside of the HAPS. For example, each of the HAPSs 10 and 20 may acquire its own current position information (for example, GPS position information), position control information (for example, flight schedule information) stored in advance, and position information on another HAPS located in a peripheral space, etc., and autonomously control the floating movement (flight) and the processing in the radio relay station based on these information.

The floating movement (flight) of each HAPS 10 and 20 and the processing in the radio relay stations may be controlled by a management apparatus (also referred to as a "remote control apparatus") 85 as a management apparatus, which is provided in a communication center or the like of the mobile communication network 80. The management apparatus 85 can be configured by, for example, a computer apparatus such as a PC, or a server, etc. In this case, the HAPSs 10 and 20 may include a communication terminal apparatus for control (for example, a mobile communication module) so that control information from the management apparatus 85 can be received and various information such as monitoring information can be transmitted to the management apparatus 85, and terminal identification information (for example, IP address, telephone number, etc.) may be allocated to the terminal communication apparatus so as to be identified from the management apparatus 85. The MAC address of the communication interface may be used for identifying the communication terminal apparatus for control. Each of the HAPSs 10 and 20 may transmit information relating to the floating movement (flight) of the HAPS itself or the surrounding HAPS and the processing at the radio relay station, information relating to status of HAPSs 10 and 20, and monitoring information such as observation data acquired by various sensors or the like, to a predetermined destination such as the management apparatus 85. The control information may include target flight-route information of the HAPS. The monitoring information may include at least one information on current positions, flight-route history information, velocities against air, velocities against the ground and propulsive directions of the HAPSs 10 and 20, wind velocities and directions of airflows around the HAPSs 10 and 20, and atmospheric pressures and temperatures around the HAPSs 10 and 20.

In the cell-formation target airspace 40, there is a possibility that a spatial area where the beams 100 and 200 of the HAPSs 10 and 20 do not pass may occur, in which the three-dimensional cells 41 and 42 are not formed. In order to spatially complement this area, as shown in the configuration example in FIG. 1, a base station (hereinafter referred to as "ATG station") 30 may be disposed, which forms a three-dimensional cell 43 by forming a radial beam 300 from the ground or the sea side upward to make an ATG (Air To Ground) connection.

By adjusting the positions of the HAPSs 10 and 20 and the divergence angle (beam width) or the like of the beams 100 and 200 without using the ATG station 30, the radio relay stations of the HAPSs 10 and 20 may form the beams 100 and 200 covering the overall upper end face of the cell-formation target airspace 40 so that three-dimensional cells are formed all over the cell-formation target airspace 40.

It is noted that, the three-dimensional cell formed by the HAPSs 10 and 20 may be formed so as to reach the ground level or the sea level so as to be able to communicate also with the terminal apparatus located on the ground or on the sea.

Figure 2:
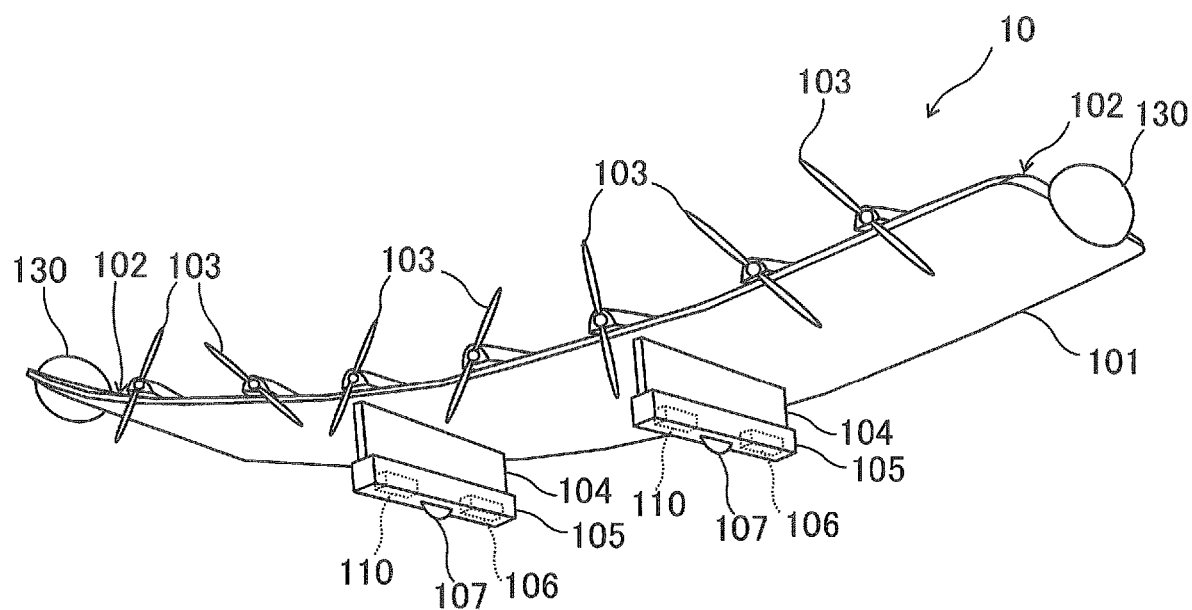
FIG. 2 is a perspective view showing an example of a HAPS used in a communication system in the embodiment.

FIG. 2 is a perspective view showing an example of the HAPS 10 used in a communication system in the embodiment.

The HAPS 10 in FIG. 2 is a solar-plane type HAPS, and has a main wing section 101, in which both end portions in the longitudinal direction are warped upward, and a plurality of motor-driven propellers 103 as propulsion apparatuses of a bus-motive power system provided at one end edge portion of the main wing section 101 in the lateral direction. A solar power generation panel (hereinafter referred to as "solar panel") 102 as a photovoltaic power generation section having a photovoltaic power generation function is provided on the upper surface of the main wing section 101. Pods 105 as a plurality of apparatus accommodating sections for accommodating the mission equipment are connected to the two positions in the longitudinal direction of the lower surface of the main wing section 101 via a plate-like connecting section 104. Inside each pod 105, a radio relay station 110 as a mission equipment and a battery 106 are accommodated. On the lower surface side of each pod 105, wheels 107 used on departure and arrival are provided. The electric power generated by the solar panel 102 is stored in the battery 106, the motor of the propeller 103 is rotationally driven by the electric power supplied from the battery 106, and the radio relay processing by the radio relay station 110 is executed.

The solar-plane type HAPS 10 can float with lift force by, for example, performing a circular turning flight, performing a flight along a figure of "D" or performing a flight along a figure of "8" based on a predetermined target flight route, and can float to stay in a predetermined range in the horizontal direction at a predetermined altitude. It is noted that, the solar-plane type HAPS 10 can also fly like a glider when the propeller 103 is not rotationally driven. For example, when electric power of the battery 106 is surplus by power generation of the solar panel 102, such as in daytime, the solar plane-type HAPS 10 rises up to a high position, and when an electric power cannot be generated by the solar panel 102 such as at night, the solar plane-type HAPS 10 can stop power supply from the battery 106 to the motor and fly like a glider.

The HAPS 10 is provided with optical antenna apparatuses 130, each of which has a three-dimensional directivity, as communication sections used for the optical communication with another HAPS and an artificial satellite. It is noted that, in the example of FIG. 2, although the optical antenna apparatuses 130 are disposed at both ends of the main wing section 101 in the longitudinal direction, the optical apparatuses 130 may be disposed at other portions of the HAPS 10. It is also noted that, the communication sections used for the optical communication with another HAPS and an artificial satellite is not limited to that of performing such optical communication, and the communication may be a radio communication by another method such as a radio communication using radio waves such as microwaves.

Figure 3:
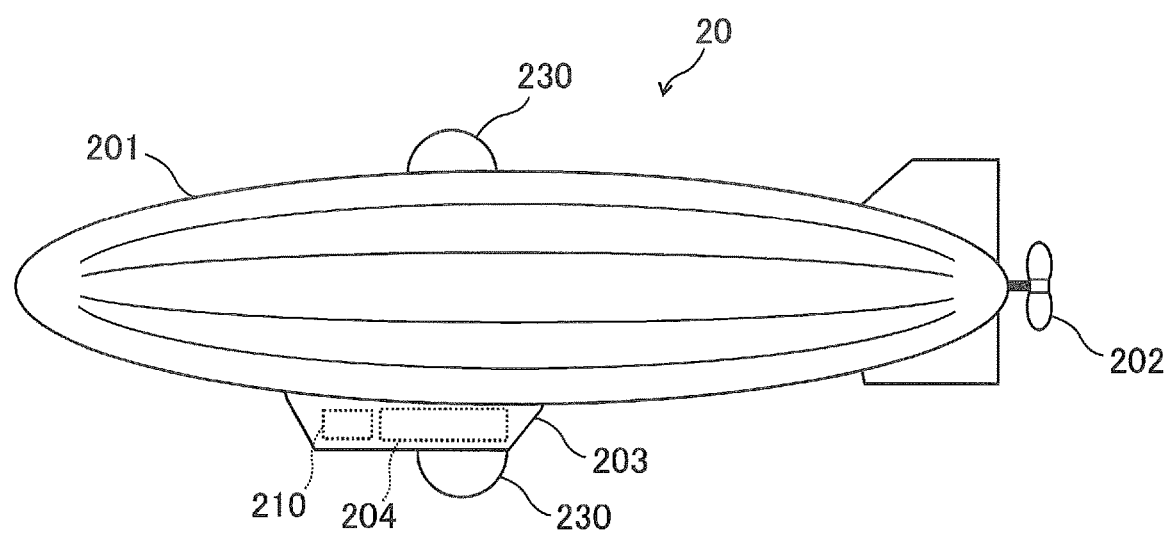
FIG. 3 is a side view showing another example of a HAPS used in the communication system in the embodiment.

FIG. 3 is a side view showing another example of the HAPS 20 used in a communication system in the embodiment.

The HAPS 20 in FIG. 3 is an unmanned airship-type HAPS, and can mount a large capacity battery since the payload is large. The HAPS 20 has an airship body 201 filled with gas such as helium gas for floating by floating power, a propeller 202 driven by a motor as a propulsion apparatus of a bus-motive power system, and an equipment accommodating section 203 in which mission equipment is accommodated. A radio relay station 210 and a battery 204 are accommodated in the equipment accommodating section 203. A motor of the propeller 202 is rotationally driven by an electric power supplied from the battery 204, and a radio relay processing by the radio relay station 210 is executed.

It is noted that, a solar panel having a photovoltaic power generation function may be provided on the top surface of the airship body 201, and an electric power generated by the solar panel is stored in the battery 204.

The unmanned airship-type HAPS 20 is also provided with optical antenna apparatuses 230, each of which has a three-dimensional directivity, as communication sections used for the optical communication with another HAPS and an artificial satellite. It is noted that, in the example of FIG. 3, although the optical antenna apparatuses 230 are disposed on the upper surface of the airship body 201 and the lower surface of the equipment accommodating section 203, the optical antenna apparatuses 230 may be disposed at other portions of the HAPS 20. It is also noted that, the communication sections used for the optical communication with another HAPS or an artificial satellites is not limited to that of performing such optical communication, and the communication may be a radio communication by another method such as a radio communication by radio waves such as microwaves.

Figure 4:
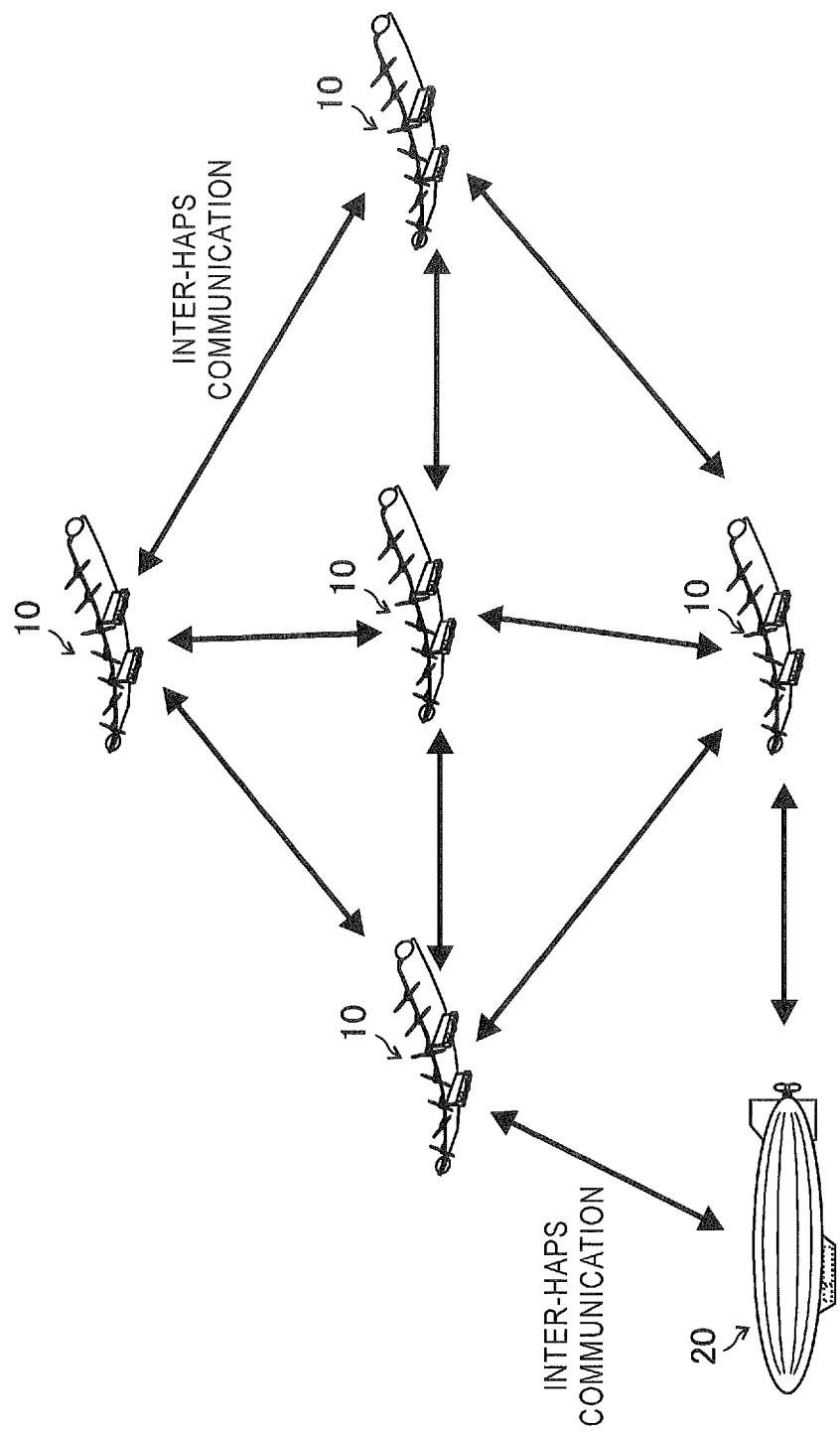
FIG. 4 is an illustration showing an example of a radio network formed in an upper airspace by a plurality of HAPSs in the embodiment.

FIG. 4 is an illustration showing an example of a radio network formed in an upper airspace by the plurality of HAPSs 10 and 20 in the embodiment.

The plurality of HAPSs 10 and 20 are configured to enable an inter-HAPS communication by the optical communication with each other in an upper airspace, and form a radio communication network with excellent robustness, which can stably realize a three-dimensional network over a wide area. This radio communication network can also function as an ad hoc network by a dynamic routing according to various environments and various information. The radio communication network can be formed to have various two dimensional or three dimensional topologies, and may be, for example, a mesh-type radio communication network as shown in FIG. 4.

Figure 5:
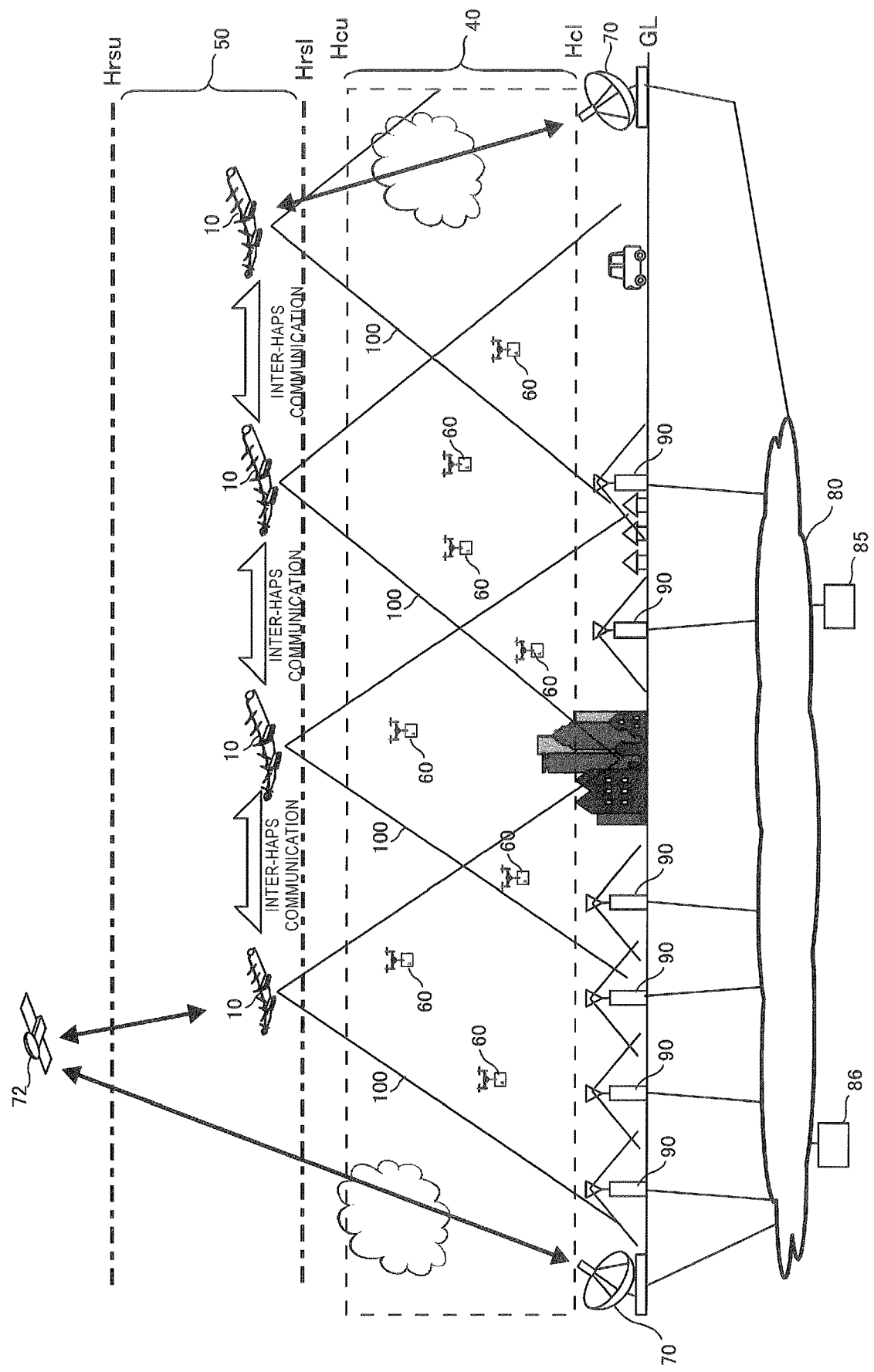
FIG. 5 is a schematic configuration diagram showing an example of an overall configuration of a communication system for realizing a three-dimensional network according to still another embodiment.

FIG. 5 is a schematic configuration diagram showing an example of an overall configuration of a communication system according to another embodiment.

It is noted that, in FIG. 5, configuration elements similar to those in FIG. 1 described above are denoted by the same reference numerals and explanations thereof are omitted.

In the embodiment of FIG. 5, a communication between the HAPS 10 and the core network of the mobile communication network 80 is performed via the feeder station 70 and a low-orbit artificial satellite 72. In this case, a communication between the artificial satellite 72 and the feeder station 70 may be performed by a radio communication using radio waves such as microwaves, or may be performed by an optical communication using laser light or the like. A communication between the HAPS 10 and the artificial satellite 72 is performed by the optical communication using laser light or the like.

Figure 6:
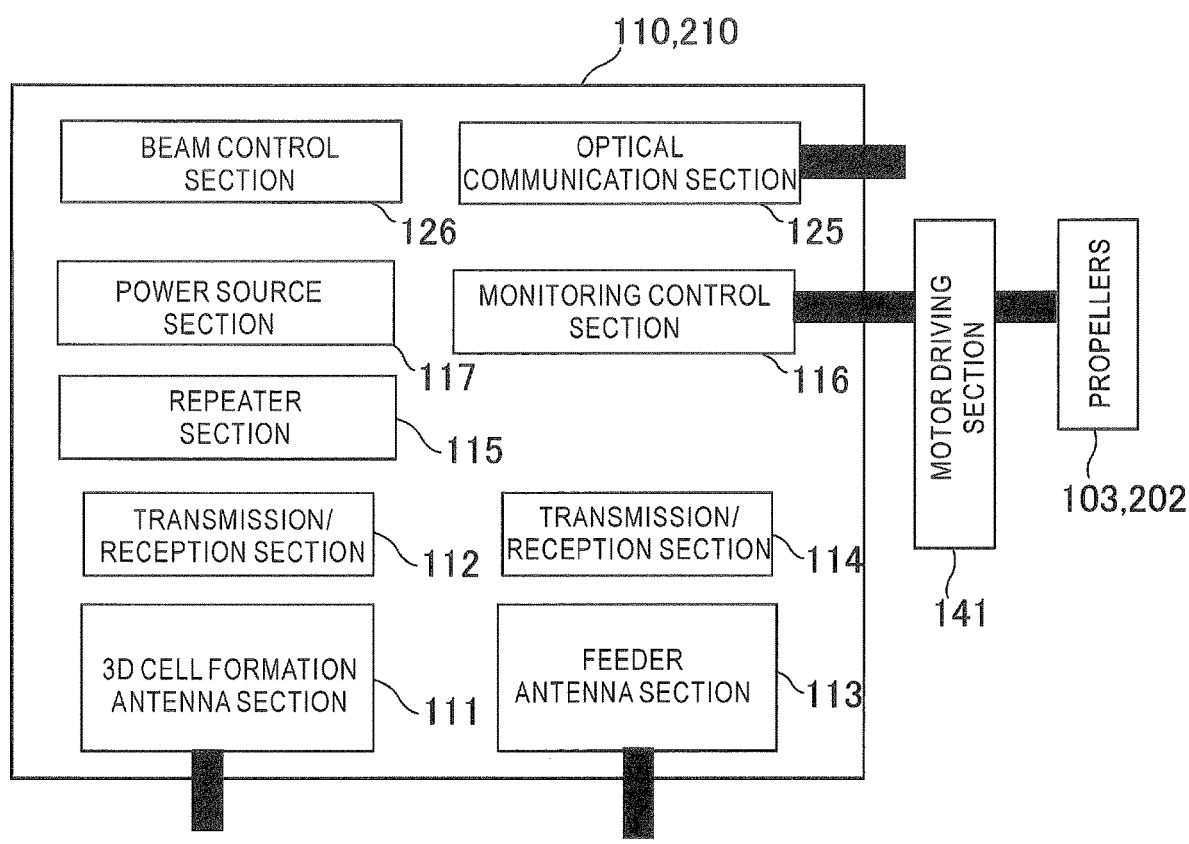
FIG. 6 is a block diagram showing a configuration example of a radio relay station of the HAPS in the embodiment.

FIG. 6 is a block diagram showing a configuration example of the radio relay stations 110 and 210 of the HAPSs 10 and 20 in the embodiment.

The radio relay stations 110 and 210 in FIG. 6 are examples of a repeater-type radio relay station. Each of the radio relay stations 110 and 210 includes a 3D cell-formation antenna section 111, a transmission/reception section 112, a feeder antenna section 113, a transmission/reception section 114, a repeater section 115, a monitoring control section 116 and a power source section 117. Furthermore, each of the radio relay stations 110 and 210 includes an optical communication section 125 used for the inter-HAPS communication and the like, and a beam control section 126.

The 3D cell-formation antenna section 111 has antennas for forming radial beams 100 and 200 toward the cell-formation target airspace 40, and forms three-dimensional cells 41 and 42 in which a communication with the terminal apparatus can be performed. The transmission/reception section 112 constitutes a first radio communication section together with the 3D cell-formation antenna section 111, has a transmission/reception duplexer (DUP: DUPlexer) and an amplifier, etc., transmits radio signals to the terminal apparatuses located in the three-dimensional cells 41 and 42 and receives radio signals from the terminal apparatuses via the 3D cell-formation antenna section 111.

The feeder antenna section 113 has a directional antenna for performing a radio communication with the feeder station 70 on the ground or on the sea. The transmission/reception section 114 constitutes a second radio communication section together with the feeder antenna section 113, has a transmission/reception duplexer (DUP: DUPlexer) and an amplifier, etc., and transmits radio signals to the feeder station 70 and receives radio signals from the feeder station 70 via the feeder antenna section 113.

The repeater section 115 relays signals of the transmission/reception section 112 which is transmitted to and received from the terminal apparatus and signals of the transmission/reception section 114 which is transmitted to and received from the feeder station 70. The repeater section 115 has an amplifier function for amplifying a relay target signal of a predetermined frequency to a predetermined level. The repeater section 115 may have a frequency conversion function for converting the frequency of the relay target signal.

The monitoring control section 116 is configured with, for example, a CPU and a memory, etc., and monitors the operation processing status of each section and controls each section in the HAPSs 10 and 20, by executing a preinstalled program. Particularly, the monitoring control section 116 controls a motor drive section 141 that drives the propellers 103 and 202 to move the HAPSs 10 and 20 to target positions, and also controls the HAPSs 10 and 20 to stay in the vicinity of the target positions, by executing a control program.

The power source section 117 supplies an electric power outputted from the batteries 106 and 204 to each section in the HAPSs 10 and 20. The power source section 117 may have a function for storing an electric power generated by the solar power generation panel or the like and an electric power supplied from the outside in the batteries 106 and 204.

The optical communication section 125 communicates with neighboring other HAPSs 10 and 20 and the artificial satellite 72 via an optical communication medium such as laser light. This communication enables a dynamic routing that dynamically relays a radio communication between the mobile communication network 80 and a terminal apparatus such as the drone 60, and can enhance a robustness of the mobile communication system by backing up and relaying wirelessly with the other HAPSs when one of the HAPSs fails.

The beam control section 126 controls a direction and intensity of a beam of laser light or the like used for the inter-HAPS communication or the communication with the artificial satellite 72, and performs a control so as to switch another HAPS (radio relay station) that performs a communication using a light beam such as the laser light according to a change in relative position with neighboring another HAPS (radio relay station). This control may be performed based on, for example, a position and posture of the HAPS itself, a position of the neighboring HAPS, and the like. Information on the position and attitude of the HAPS itself may be acquired based on an output of a GPS receiver, a gyro sensor, an acceleration sensor or the like incorporated in the HAPS, and information on the position of the neighboring HAPS may be acquired from the management apparatus 85 provided in the mobile communication network 80 or a server 86 such as a HAPS management server or an application server.

Figure 7:
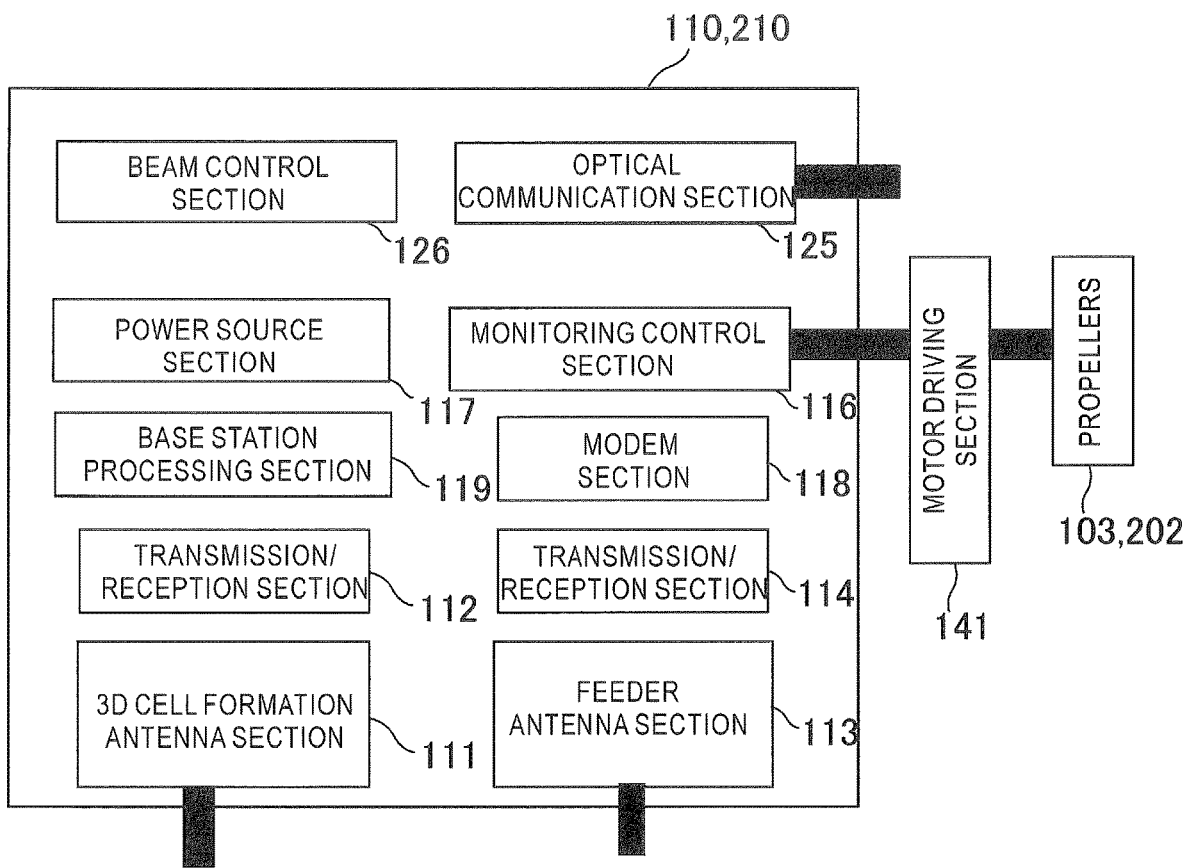
FIG. 7 is a block diagram showing another configuration example of a radio relay station of the HAPS in the embodiment.

FIG. 7 is a block diagram showing another configuration example of the radio relay stations 110 and 210 of the HAPSs 10 and 20 in the embodiment.

The radio relay stations 110 and 210 in FIG. 7 are examples of base station type of radio relay stations.

It is noted that, in FIG. 7, configuration elements similar to those in FIG. 6 are denoted by the same reference numerals and explanations thereof are omitted. Each of the radio relay stations 110 and 210 in FIG. 7 further includes a modem section 118 and a base-station processing section 119 instead of the repeater section 115. Further, each of the radio relay stations 110 and 210 includes the optical communication section 125 and the beam control section 126.

The modem section 118, for example, performs a demodulation processing and a decoding processing for a reception signal received from the feeder station 70 via the feeder antenna section 113 and the transmission/reception section 114, and generates a data signal to be outputted to the base-station processing section 119. The modem section 118 performs an encoding processing and a modulation processing for the data signal received from the base-station processing section 119, and generates a transmission signal to be transmitted to the feeder station 70 via the feeder antenna section 113 and the transmission/reception section 114.

The base-station processing section 119, for example, has a function as an e-Node B that performs a baseband processing based on a method conforming to the standard of LTE/LTE-Advanced. The base-station processing section 119 may process in a method conforming to a future standard of mobile communication such as the fifth generation.

The base-station processing section 119, for example, performs a demodulation processing and a decoding processing for a reception signal received from a terminal apparatus located in the three-dimensional cells 41 and 42 via the 3D cell-formation antenna section 111 and the transmission/reception section 112, and generates a data signal to be outputted to the modem section 118. The base-station processing section 119 performs an encoding processing and a modulation processing for the data signal received from the modem section 118, and generates a transmission signal to be transmitted to the terminal apparatus of the three-dimensional cells 41 and 42 via the 3D cell-formation antenna section 111 and the transmission/reception section 112.

Figure 8:
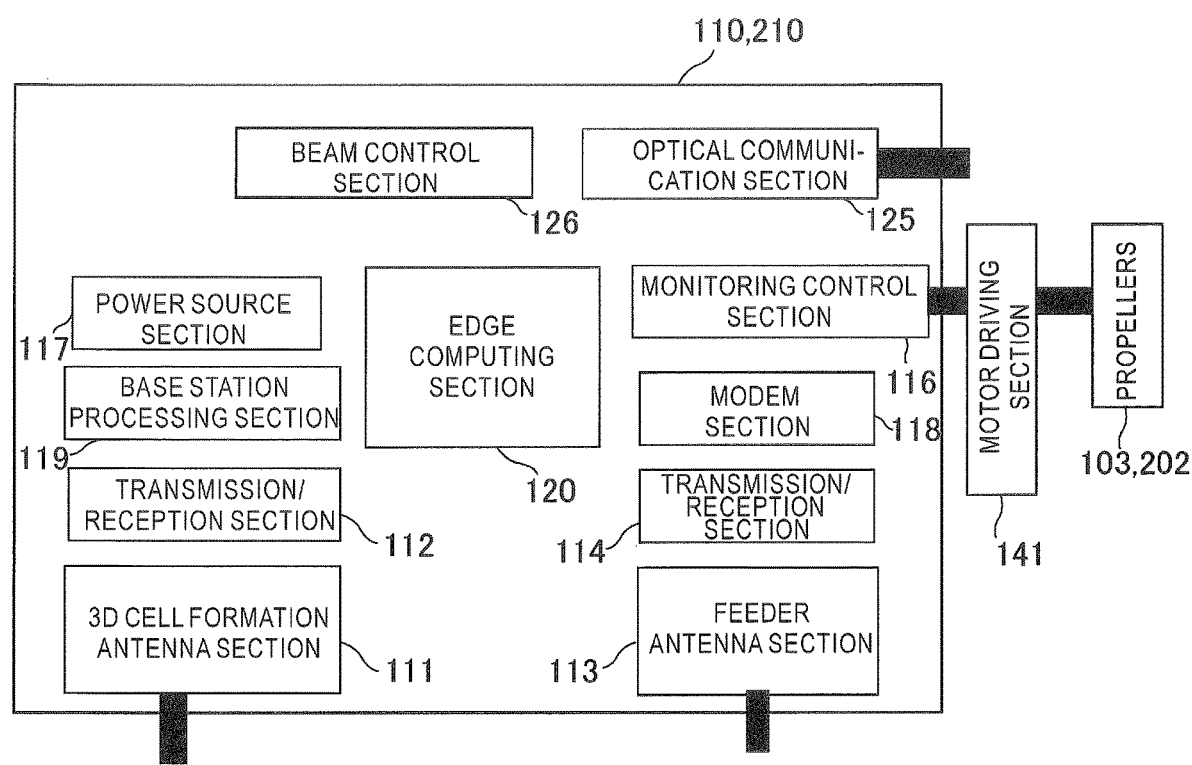
FIG. 8 is a block diagram showing still another configuration example of a radio relay station of the HAPS in the embodiment.

FIG. 8 is a block diagram showing still another configuration example of radio relay stations 110 and 210 of the HAPSs 10 and 20 in the embodiment.

The radio relay stations 110 and 210 in FIG. 8 are examples of high-performance base-station type of radio relay stations having an edge computing function. It is noted that, in FIG. 8, configuration elements similar to those in FIG. 6 and FIG. 7 are denoted by the same reference numerals and explanations thereof are omitted. Each of the radio relay stations 110 and 210 in FIG. 8 further includes an edge computing section 120 in addition to the configuration elements in FIG. 7.

The edge computing section 120 is configured with, for example, a compact computer, and can perform various types of information processing relating to a radio relay and the like in the radio relay stations 110 and 210 of the HAPSs 10 and 20, by executing a preinstalled program.

The edge computing section 120, for example, determines a transmission destination of a data signal based on data signals received from a terminal apparatus located in the three-dimensional cells 41 and 42, and performs a processing of switching a relay destination of communication based on the determination result. More specifically, in case that the transmission destination of the data signal outputted from the base-station processing section 119 is a terminal apparatus located in the own three-dimensional cells 41 and 42, instead of passing the data signal to the modem section 118, the edge computing section 120 returns the data signal to the base-station processing section 119, and transmits the data signal to the terminal apparatus of the transmission destination located in the own three-dimensional cells 41 and 42. On the other hand, in case that the transmission destination of the data signal outputted from the base-station processing section 119 is a terminal apparatus located in a cell other than the own three-dimensional cells 41 and 42, the edge computing section 120 passes the data signal to the modem section 118 and transmits the data signal to the feeder station 70, and transmits the data signal to the terminal apparatus of the transmission destination located in the other cell of the transmission destination via the mobile communication network 80.

The edge computing section 120 may perform a process of analyzing information received from a large number of terminal apparatuses located in the three-dimensional cells 41 and 42. This analysis result may be transmitted to a large number of terminal apparatuses located in the three-dimensional cells 41 and 42, and may be transmitted to the management apparatus 85 provided in the mobile communication network 80, or the server 86 such as a HAPS management server as a management apparatus and an application server (App server).

Uplink and downlink duplex methods for radio communication with a terminal apparatus via the radio relay stations 110 and 210 are not limited to a specific method, and may be, for example, a time division duplex method (Time Division Duplex: TDD) or a frequency division duplex method (Frequency Division Duplex: FDD). An access method for radio communication with a terminal apparatus via the radio relay stations 110 and 210 is not limited to a specific method, and may be, for example, FDMA (Frequency Division Multiple Access) method, TDMA (Time Division Multiple Access) method, CDMA (Code Division Multiple Access) method or OFDMA (Orthogonal Frequency Division Multiple Access). In the foregoing radio communication, a MIMO (Multi-Input and Multi-Output) technology may be used, which has functions of diversity/coding, transmission beam forming, spatial division multiplexing (SDM: Spatial Division Multiplexing), etc., and in which a transmission capacity per unit frequency can be increased by simultaneously using a plurality of antennas for both of transmission and reception. The MIMO technology may be an SU-MIMO (Single-User MIMO) technology in which one base station transmits a plurality of signals to one terminal apparatus at the same time/same frequency, and may be an MU-MIMO (Multi-User MIMO) technology in which one base station transmits signals to a plurality of different terminal apparatuses at the same time/same frequency or a plurality of different base stations transmit signals to one terminal apparatus at the same time/same frequency.

Hereinafter, although a case where a radio relay apparatus for performing a radio communication with a terminal apparatus is the solar-plane type HAPS 10 having the radio relay station 110 is described, the following embodiments can be similarly applied to another radio relay apparatus capable of moving in an upper airspace such as the unmanned-airship type HAPS 20 having the radio relay station 210.

A link between the HAPS 10 having the radio relay station 110 and a base station 90 via a gateway station (hereinafter abbreviated as "GW station") 70 as a feeder station is referred to as a "feeder link", and a link between the HAPS 10 and the terminal apparatus 61 is referred to as a "service link". Particularly, a section between the HAPS 10 and the GW station 70 is referred to as a "radio section of feeder link". A downlink of a communication from the GW station 70 to the terminal apparatus 61 via the HAPS 10 is referred to as a "forward link", and an uplink of a communication from the terminal apparatus 61 to the GW station 70 via the HAPS 10 is referred to as a "reverse link".

When a plurality of cells 100A are formed on the ground or on the sea by the plurality of HAPS 10 capable of moving in the upper airspace in the present embodiment, a size of a cell boundary area and a distance between cells may change and a communication quality may deteriorate by frequent handovers at the cell boundary.

Therefore, the HAPS 10 in the present embodiment is controlled to fly in cooperation with each other in a same flight configuration so as to maintain a positional relationship between the HAPSs by autonomous control or external control. As a result, a size of an SINR deterioration area, in which an SINR (required signal-to-interference/noise power ratio) as the communication quality is deteriorated, becomes constant.

Figure 9A:
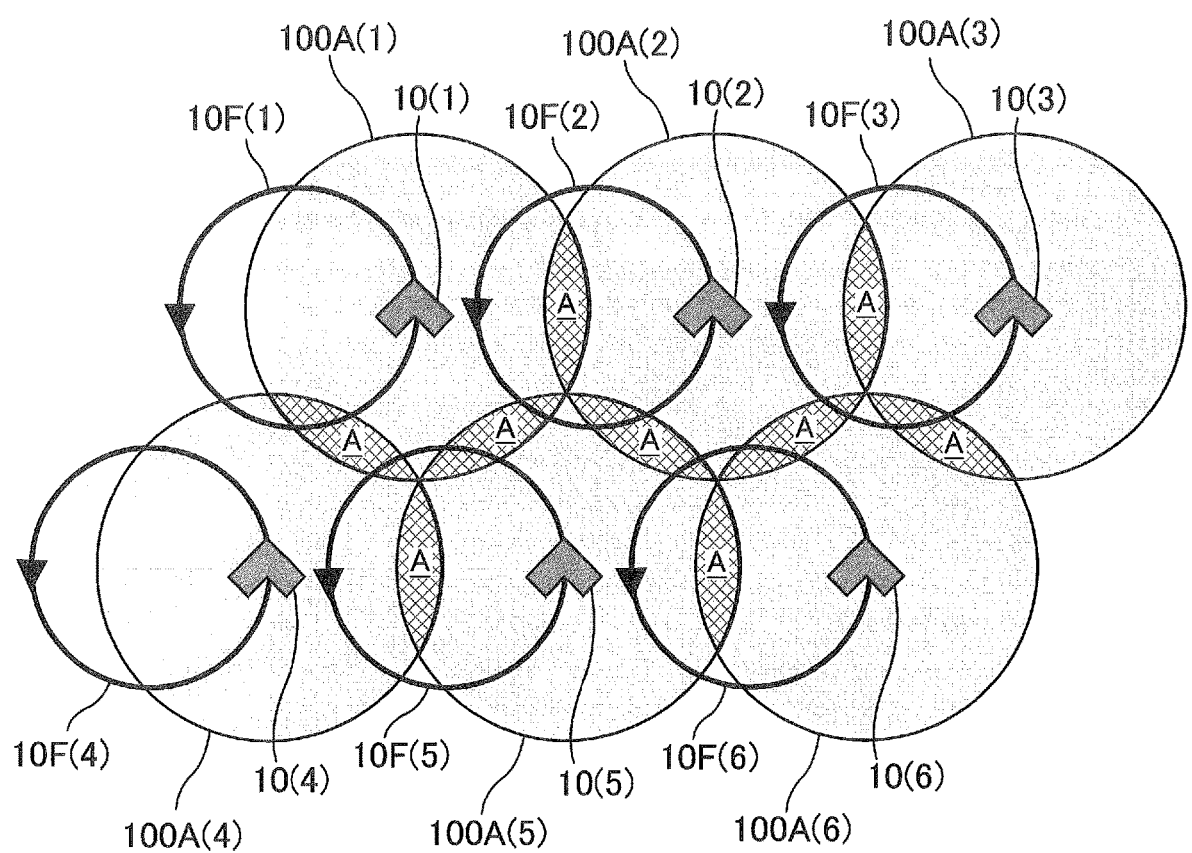
FIG. 9A is an illustration showing an example of a cooperative flight of a plurality of HAPSs according to the embodiment.
Figure 9B:
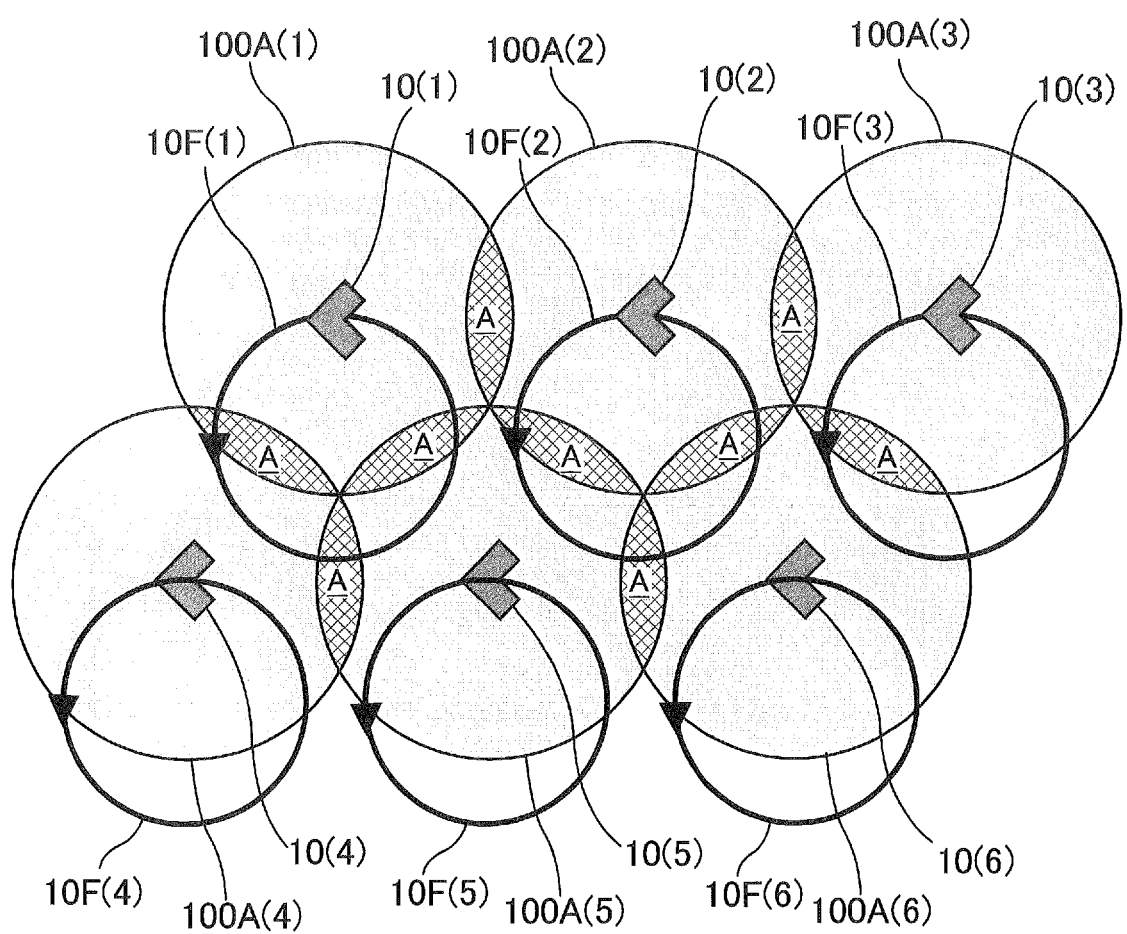
FIG. 9B is an illustration showing an example of a cooperative flight of a plurality of HAPSs according to the embodiment.
Figure 10A:
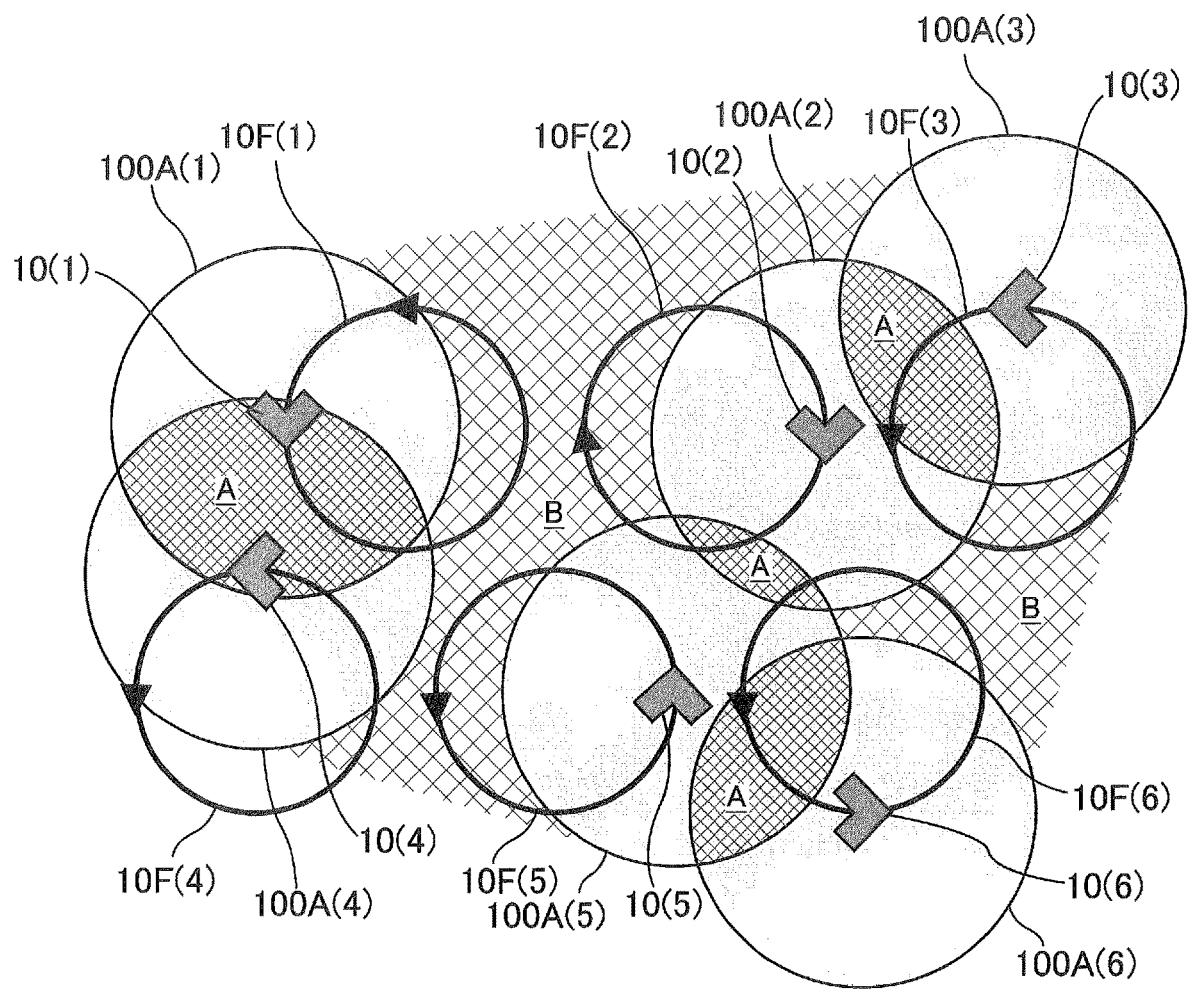
FIG. 10A is an illustration showing an example of a plurality of HAPSs in a disorderly flight state according to a comparative example.
Figure 10B:
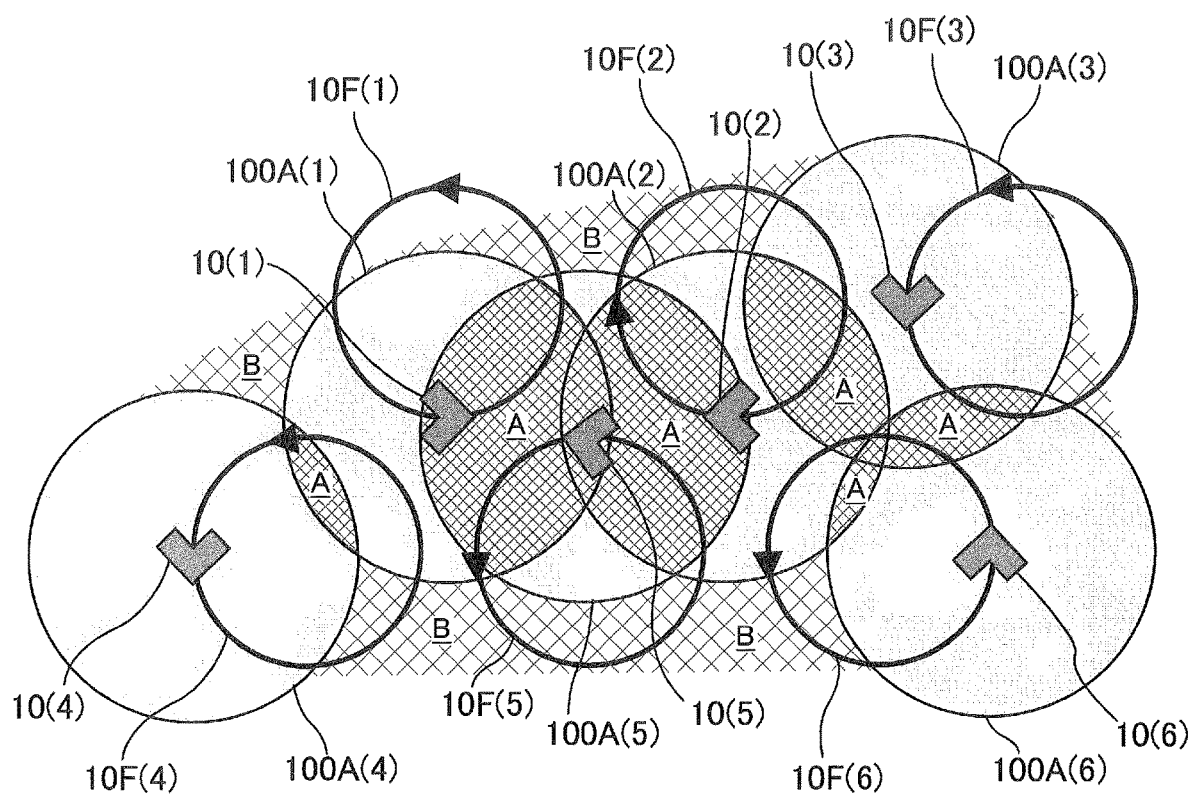
FIG. 10B is an illustration showing an example of a plurality of HAPSs in a disorderly flight state according to a comparative example.

FIG. 9A and FIG. 9B are illustrations showing an example of a cooperative flight of a plurality of HAPSs 10 according to the embodiment. FIG. 10A and FIG. 10B are illustrations showing an example of a plurality of HAPSs 10 in a disorderly flight state according to a comparative example. Each of the FIG. 9A, FIG. 9B, FIG. 10A and FIG. 10B is an illustration of a plurality of HAPSs 10(1) to 10(6) to be flight-controlled, flight routes 10F(1) to 10F(6) thereof and cells 100A(1) to 100A(6), as viewed from above in the vertical direction. An area shown by cross hatching at a cell boundary in the figure is the SINR deterioration area A. It is noted that, although the examples of FIG. 9A and FIG. 9B are shown for the case where the number of HAPSs 10 is 6, the number of HAPSs 10 may be 2 to 5, or more than 7.

In FIG. 9A and FIG. 9B, the plurality of HAPSs 10 are respectively flight-controlled so as to repeatedly perform a cyclic flight in circulation along the same circular flight routes 10F(1) to 10F(6), while forming cells 100A(1) to 100A(6) below in the vertical direction, by an autonomous control or external control. Then, the respective HAPSs 10 are controlled to fly in cooperation with each other so as to maintain a horizontal positional relationship between the HAPSs (for example, a distance between the HAPSs) by an autonomous control or external control.

For example, at a flight timing shown in FIG. 9A, each of the plurality of HAPSs 10(1) to 10(6) is controlled so as to perform a cooperative flight in which the positions of the right edges of the flight routes 10F(1) to 10F(6) in the horizontal direction in the figure are directed upward in the figure, while forming the cells 100A(1) to 100A(6) below in the vertical direction. After that, at a flight timing shown in FIG. 9B, each of the plurality of HAPSs 10(1) to 10(6) is controlled so as to perform a cooperative flight in which the positions of the upper edges of the flight routes 10F(1) to 10F(6) in the horizontal direction in the figure are directed toward the left in the figure, while forming the cells 100A(1) to 100A(6) below in the vertical direction. As shown in FIG. 9A and FIG. 9B, even if the flight time has elapsed, the size of the SINR deterioration areas A in the cells 100A(1) to 100A(6) formed by the plurality of HAPSs 10(1) to 10(6) are maintained. The SINR deterioration can be suppressed by flying in this way, while an occurrence of handover can be suppressed by performing the cooperative flight so as not to cause a change in the cell boundary line.

On the other hand, when the plurality of HAPSs 10(1) to 10(6) fly in disorderly manner without cooperating with each other as in the comparative examples of FIG. 10A and FIG. 10B, there are variations in the size of the SINR deterioration areas A at the cell boundaries, and the SINR deterioration areas B easily occur between the cells.

Moreover, the sizes of the SINR deterioration areas A and B change depending on the flights of the HAPSs 10(1) to 10(6).

It is noted that, in the examples of FIG. 9A and FIG. 9B, each of the plurality of HAPSs 10(1) to 10(6) may perform the cooperative flight so as to maintain a positional relationship between the HAPSs in the height direction. For example, the plurality of HAPSs 10(1) to 10(6) may perform the cooperative flight so as to maintain a same altitude with each other. In this case, since the HAPSs 10(1) to 10(6) move up and down together and the desired signal and the interference signal decrease and increase together, the SINR deterioration becomes constant.

In the example of FIG. 9A and FIG. 9B, each of the plurality of HAPSs 10(1) to 10(6) may perform a cooperative flight so that their attitudes with respect to the flight directions (for example, an inclination such as a rolling or pitching with respect to the traveling direction) are the same among the HAPSs as each other.

Figure 11A:
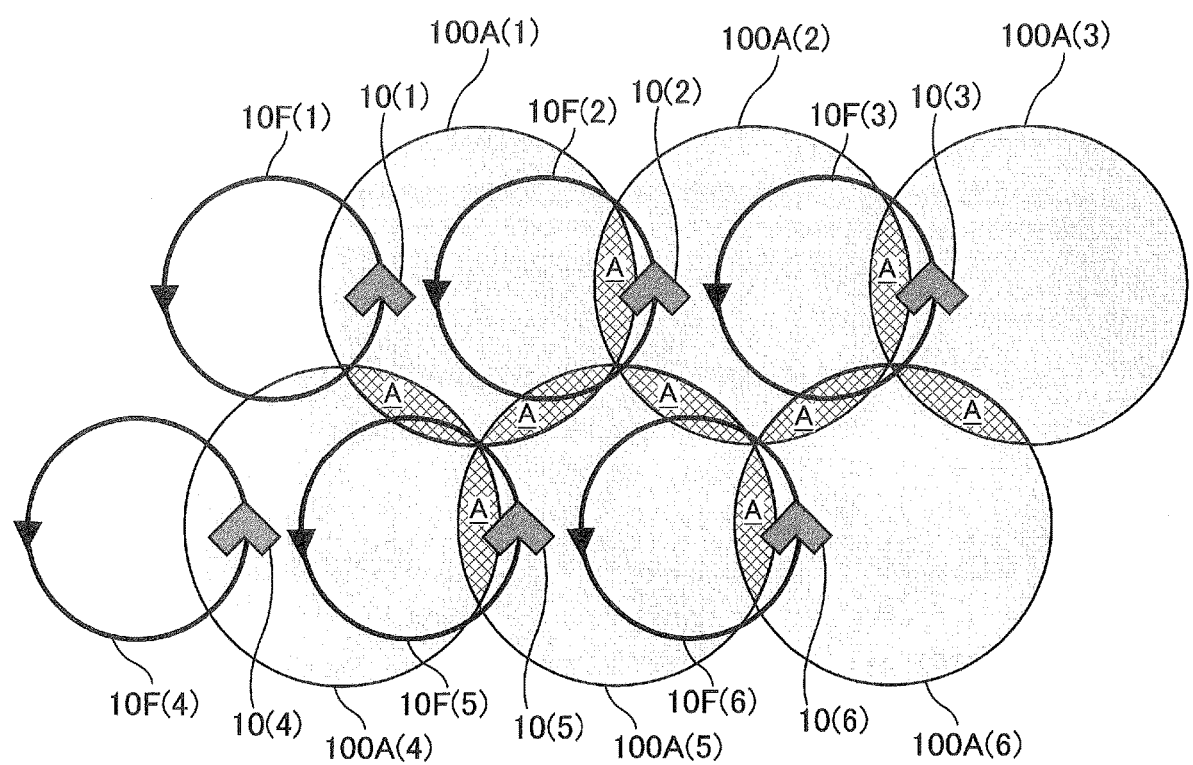
FIG. 11A is an illustration showing another example of a cooperative flight of a plurality of HAPSs according to the embodiment.
Figure 11B:
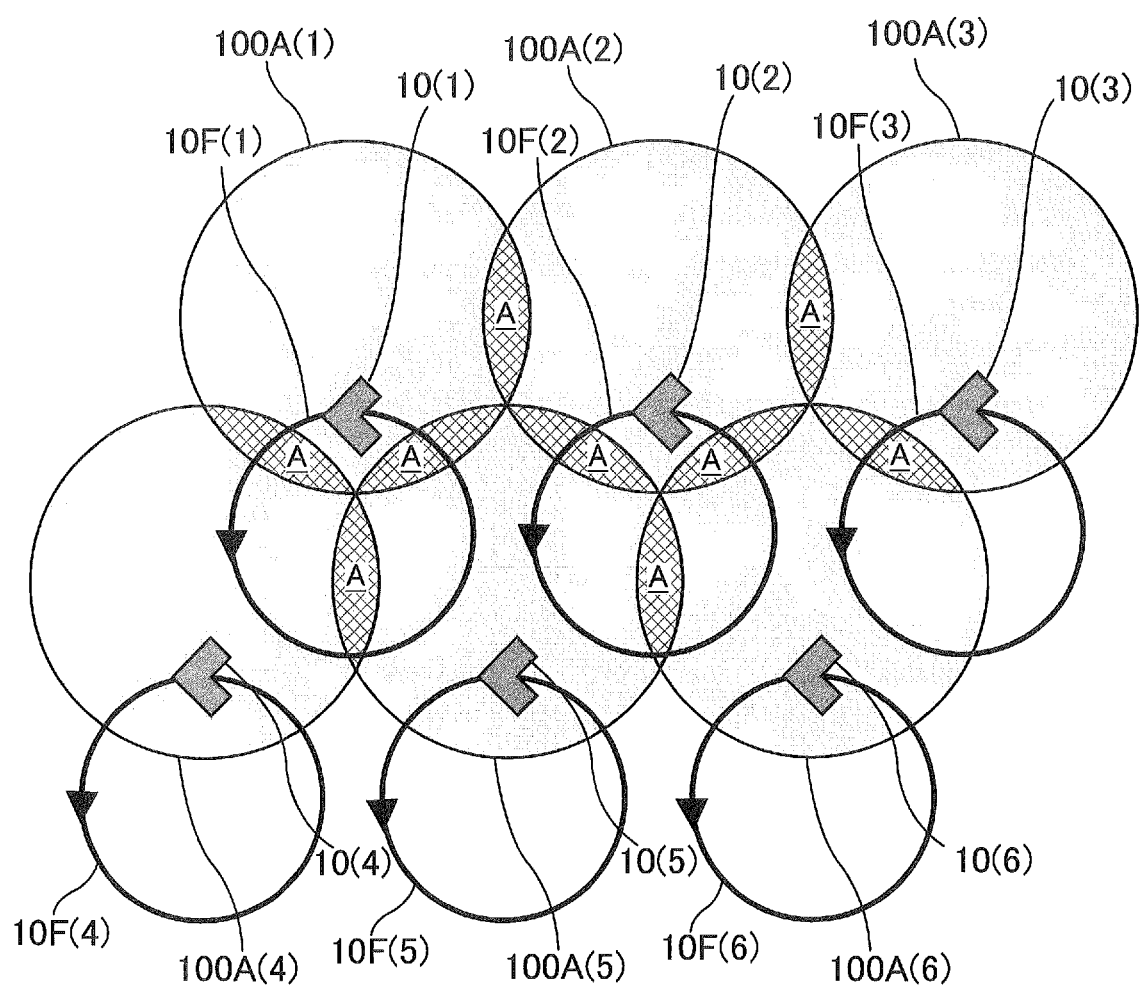
FIG. 11B is an illustration showing another example of a cooperative flight of a plurality of HAPSs according to the embodiment.
Figure 12A:
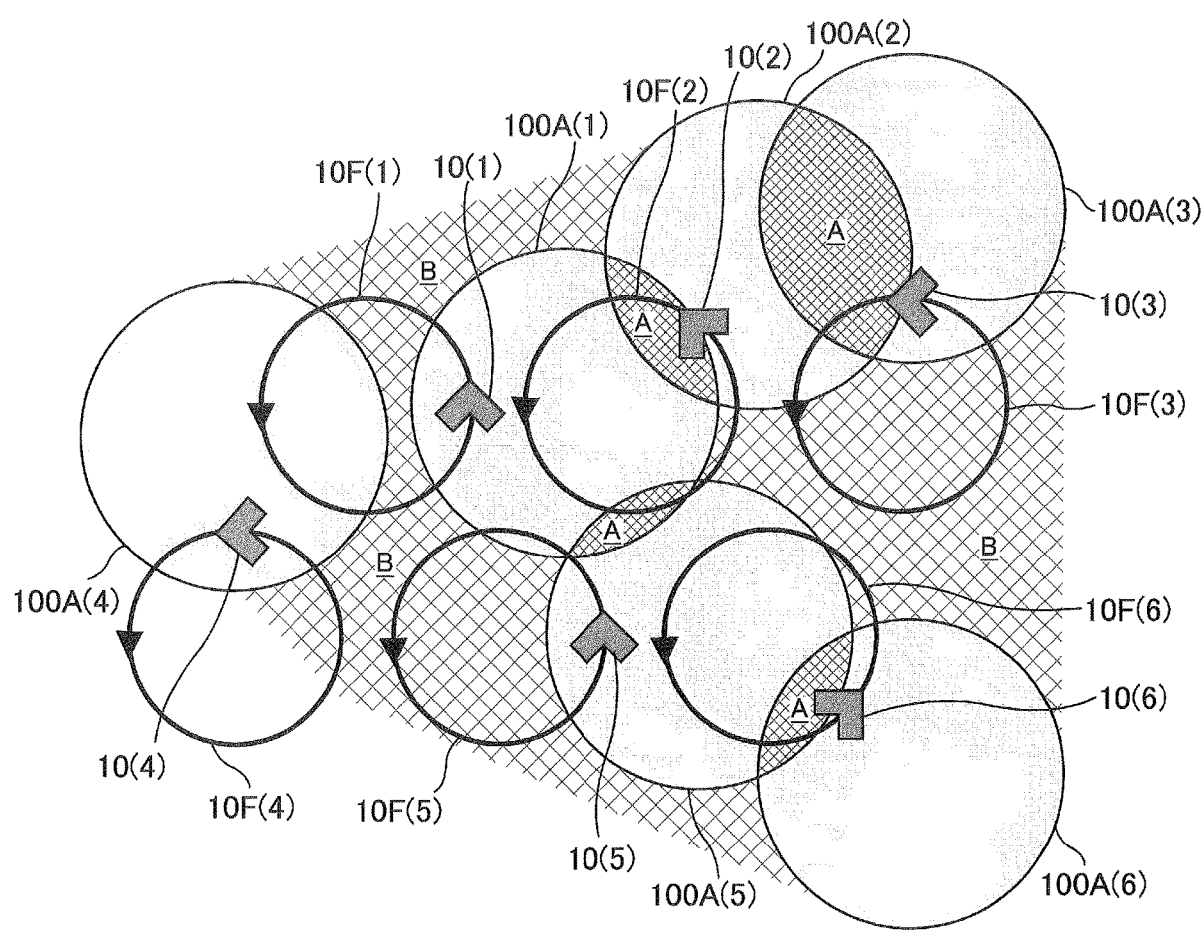
FIG. 12A is an illustration showing another example of a plurality of HAPSs in a disorderly flight state according to a comparative example.
Figure 12B:
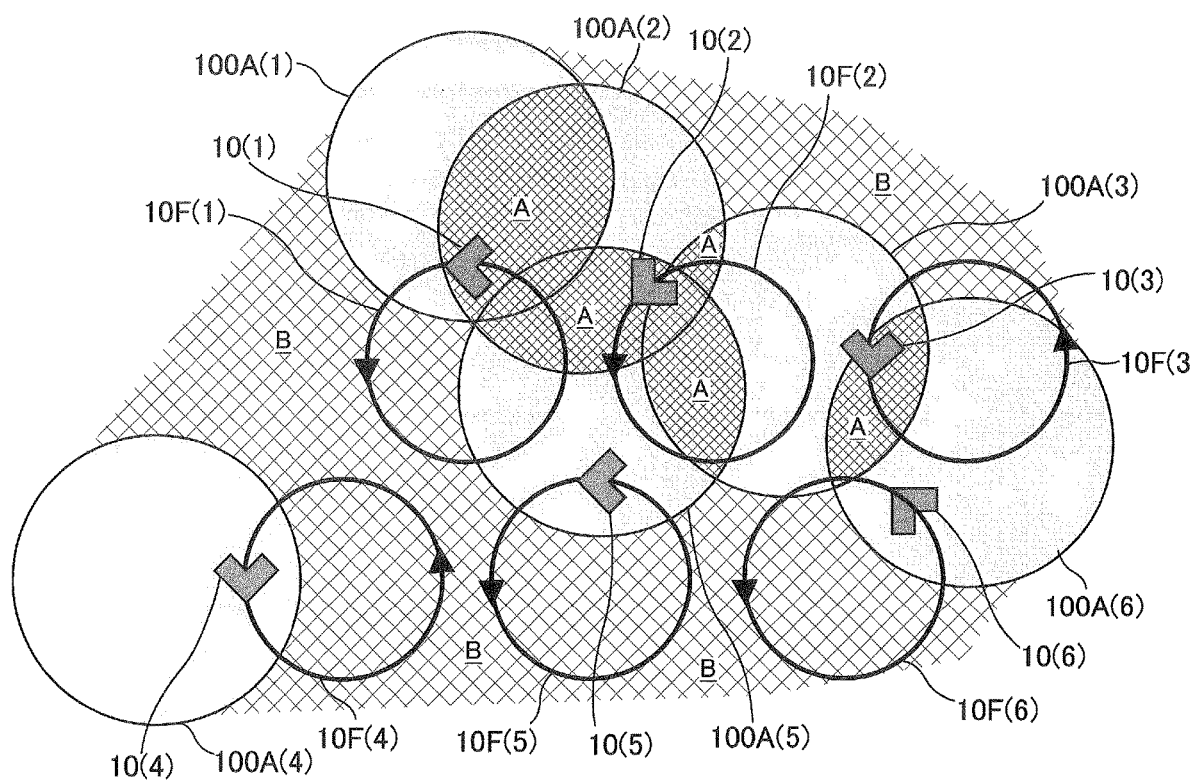
FIG. 12B is an illustration showing another example of a plurality of HAPSs in a disorderly flight state according to a comparative example.

FIG. 11A and FIG. 11B are illustrations showing another example of the cooperative flight of the plurality of HAPSs 10 according to the embodiment. FIG. 12A and FIG. 12B are illustrations showing another example of the plurality of HAPSs 10 in a disorderly flight state according to a comparative example. FIG. 11A, FIG. 11B, FIG. 12A and FIG. 12B are examples in which the HAPSs 10 form cells in a direction inclined from the vertical direction. It is noted that, in FIG. 11A, FIG. 11B, FIG. 12A and FIG. 12B, parts common to those in FIG. 9A, FIG. 9B, FIG. 10A and FIG. 10B described above are denoted by the same reference numerals and explanations thereof are omitted.

The plurality of HAPSs 10 are respectively flight-controlled so as to repeatedly perform a cyclic flight in circulation along the same circular flight routes 10F(1) to 10F(6), while forming cells 100A(1) to 100A(6) in a direction inclined from the vertical direction by its own rolling, by an autonomous control or external control. Then, the respective HAPSs 10 are controlled to fly in cooperation with each other so as to maintain a horizontal positional relationship between the HAPSs (for example, a distance between the HAPSs) by an autonomous control or external control.

For example, at a flight timing shown in FIG. 11A, each of the plurality of HAPSs 10(1) to 10(6) is controlled so as to perform a cooperative flight in which the positions of the right edges of the flight routes 10F(1) to 10F(6) in the horizontal direction in the figure are directed upward in the figure, while forming the cells 100A(1) to 100A (6) at the positions shifted from the lower side in the vertical direction to the right side in the figure by rolling in which the right side edge in the figure is higher than the left side edge. Then, at a flight timing shown in FIG. 11B, each of the plurality of HAPSs 10(1) to 10(6) is controlled so as to perform a cooperative flight in which the positions of the upper edges of the flight routes 10F(1) to 10F(6) in the horizontal direction in the figure are directed toward the left in the figure, while forming the cells 100A(1) to 100A(6) at the positions shifted from the lower side in the vertical direction to the upper side in the figure by the rolling in which the upper side edge in the figure is higher than the lower side edge. Even if the flight time has elapsed as shown in FIG. 11A and FIG. 11B, the size of the SINR deterioration areas A of the cells 100A(1) to 100A(6) formed by the plurality of HAPSs 10(1) to 10(6) flying while rolling is maintained. The SINR deterioration can be suppressed by flying in this way, while an occurrence of handover can be suppressed by performing the cooperative flight so as not to cause a change in the cell boundary line.

On the other hand, when the plurality of HAPSs 10(1) to 10(6) fly in disorderly manner without cooperating with each other as in the comparative examples of FIG. 12A and FIG. 12B, there are variations in the size of the SINR deterioration areas A at the cell boundaries, and the SINR deterioration areas B, in which the SINR between the cells is deteriorated, is likely to occur. Moreover, the sizes of the SINR deterioration areas A and B change depending on the flights of the HAPSs 10(1) to 10(6).

It is noted that, in the examples in FIG. 11A and FIG. 11B, the plurality of HAPSs 10(1) to 10(6) may perform the cooperative flight so as to maintain the positional relationship between the HAPSs in the height direction.

Although, the examples of FIG. 9A, FIG. 9B, FIG. 11A and FIG. 11B describe the case where the shape of the flight routes, in which the plurality of HAPSs 10 are controlled to perform the cooperative flight, is circular, the flight routes of the HAPSs 10 subject to the cooperative flight control may be shaped other than circular.

Figure 13C:
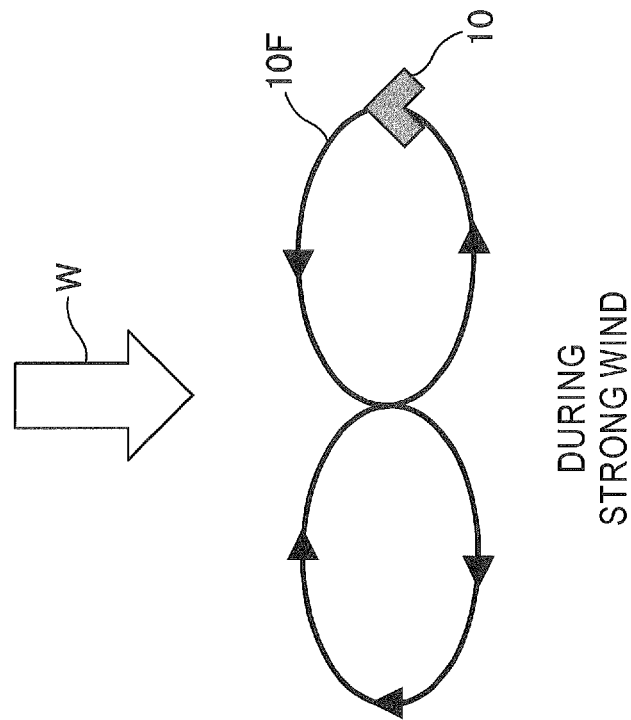
FIG. 13C is an illustration showing an example of a shape of a flight route that is determined depending on strength of a wind in an upper airspace in which HAPS is flying.
Figure 13B:
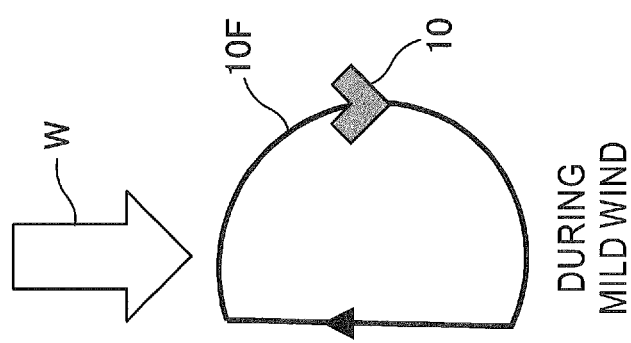
FIG. 13B is an illustration showing an example of a shape of a flight route that is determined depending on strength of a wind in an upper airspace in which HAPS is flying.
Figure 13A:
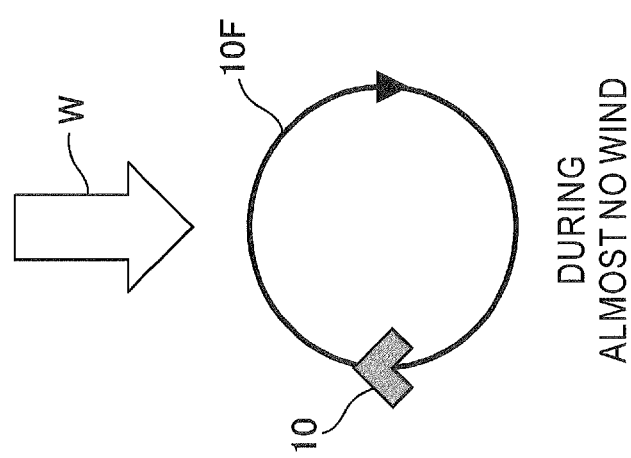
FIG. 13A is an illustration showing an example of a shape of a flight route that is determined depending on strength of a wind in an upper airspace in which HAPS is flying.

FIG. 13A to FIG. 13C are illustrations showing an example of a shape of the flight route 10F determined depending on strength of a wind W in an upper airspace in which the HAPS 10 is flying. As shown in FIG. 13A, FIG. 13B, and FIG. 13C, a shape of a flight route may be changed depending on a wind velocity in an airspace with an altitude (for example, the stratosphere) in which the HAPS 10 is flying. For example, when there is almost no wind in FIG. 13A, a circular flight route is determined as the flight route of the HAPS 10 regardless of the direction of the wind W. When the wind is mild as shown in FIG. 13B, the flight route of the HAPS 10 is determined to be a flight route along a figure of "D" in which an arc portion of the circle is a straight line, so that the time of flight in the direction of the wind (against the wind W) is as short as possible. When the wind is strong as shown in FIG. 13C, the flight route of the HAPS 10 is determined to be a flight route along a figure of "8" so that the time period in which the wind is blowing (against the wind W) becomes shorter. In this way, when the shape of the flight route 10F is changed depending on the strength of the wind W in the upper airspace, the plurality of HAPSs 10 are controlled to perform the cooperative flight according to the changed flight route 10F in the present embodiment.

Further, there is a case where the plurality of HAPSs 10 fly so as to rise spirally while charging the battery by the solar power generation during the daytime when sunlight can be received, and fly to charge the battery with the rotational energy of the propeller that is converted from the potential energy by a gliding flight that spirals down during the nighttime when the sunlight cannot be received. In this way, even when flying on the spiral ascending or descending flight route during the daytime and nighttime, the plurality of HAPSs 10 are controlled to perform the cooperative flight according to the spiral flight route of the daytime or the nighttime in the present embodiment.

Furthermore, in the present embodiment, there is a case where the distance between the HPASs adjacent to each other is several hundred km (for example, about 200 km), the environments such as weather conditions are different from each other even in a stable stratosphere, and it is not efficient to take the same flight configuration in cooperation. Therefore, the cooperative flight may be performed by grouping the plurality of HAPSs 10 depending on meteorological environment conditions on the airspace with the altitude (for example, stratosphere) in which the HAPSs 10 are flying. The groups of the HAPSs 10 may be changed depending on the weather environment conditions.

Figure 14:
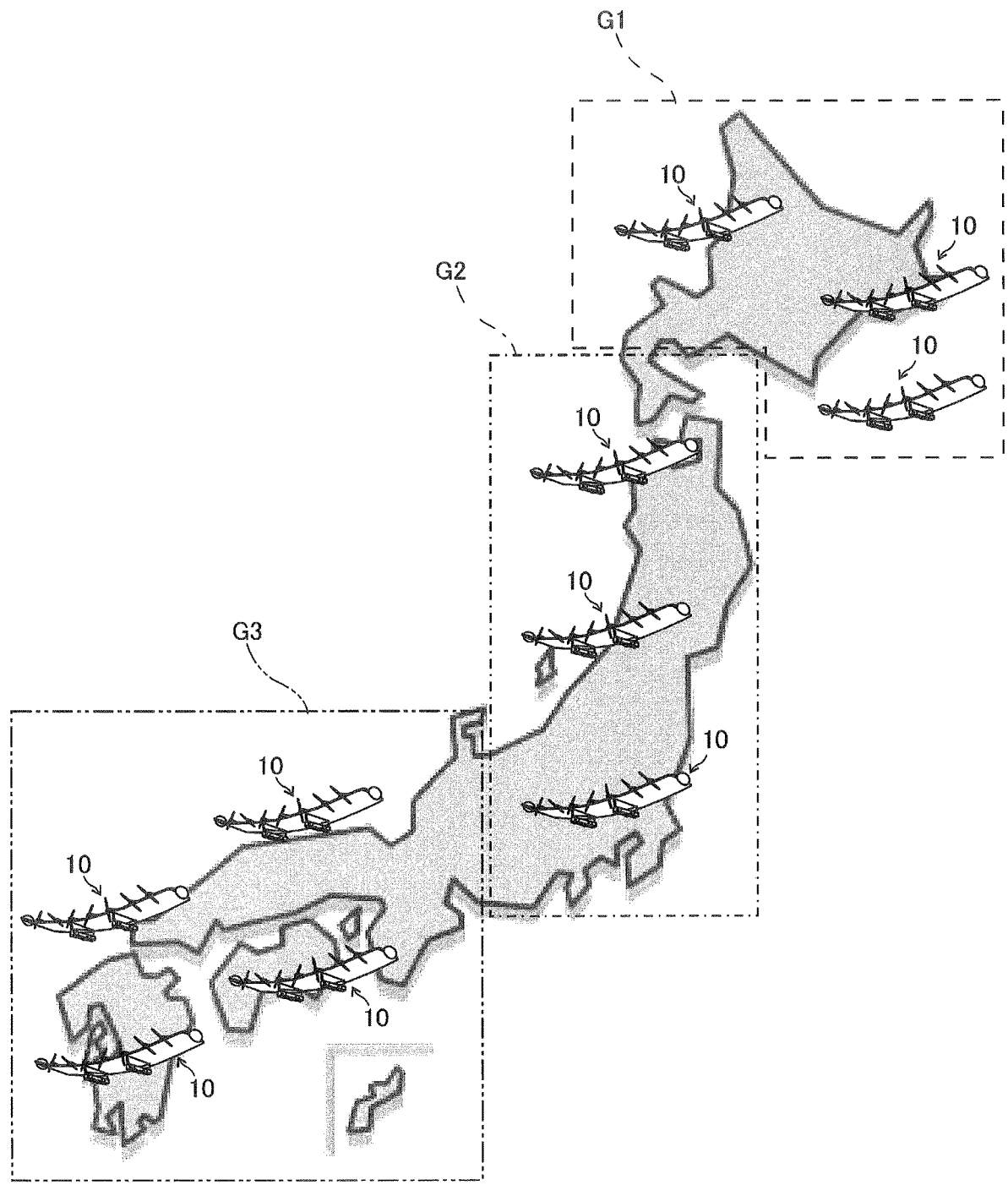
FIG. 14 is an illustration showing an example of a group cooperative flight of HAPS according to the embodiment.

FIG. 14 is an illustration showing an example of a group cooperative flight of HAPS according to the embodiment. In FIG. 14, considering the meteorological environmental conditions such as weather and a wind velocity in an upper airspace, the plurality of HAPSs 10 covering Japan are grouped into plural groups in Japan, that is, a HAPS group G1 that mainly covers the Hokkaido area, a HAPS group G2 that mainly covers the East Japan area except Hokkaido, and a HAPS group G3 that mainly covers the West Japan area including Okinawa. By controlling the above-mentioned cooperative flight of the HAPSs 10 for each of these groups G1, G2, G3, it is possible to fly the HAPSs 10 in the shape of flight route (flight configuration) according to the meteorological environmental conditions such as the weather and the wind velocity in the upper airspace, and it is not needed to force the HAPS 10 to perform a unreasonable fly.

Figure 15:
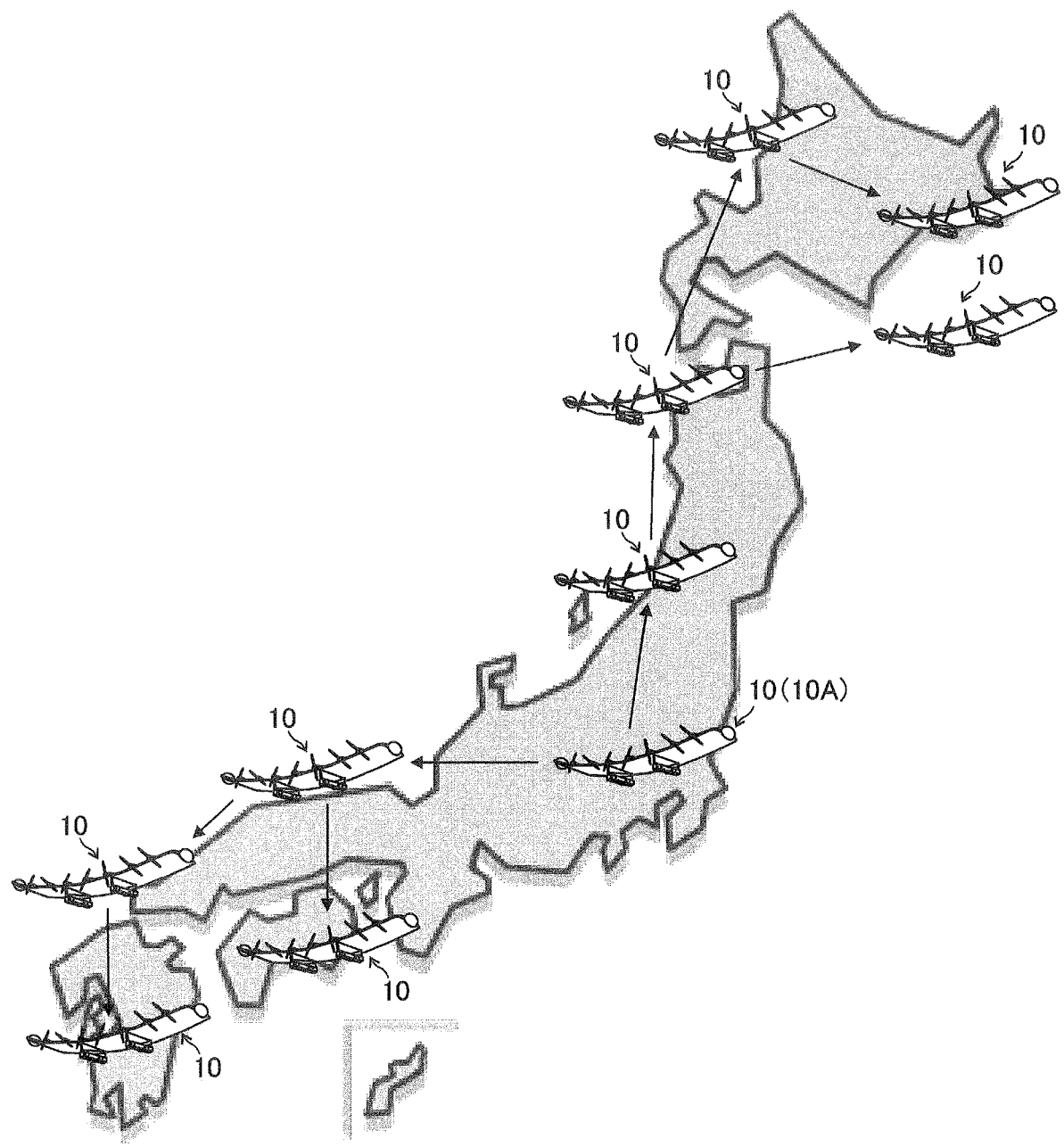
FIG. 15 is illustration showing an example of a cooperative flight of HAPSs centered on an anchor HAPS aircraft according to the embodiment.

FIG. 15 is an illustration showing an example of a cooperative flight of the HAPSs 10 centered on an anchor HAPS aircraft according to the embodiment. An arrow between the HAPSs in FIG. 15 indicates a transmission direction of control information. In the example of FIG. 15, any one HAPS of the plurality of HAPSs 10 subject to a cooperative flight control is set as the HAPS (hereinafter referred to as "anchor HAPS") 10A which is a reference for flight control. By sequentially transmitting the control information on each HAPS 10 centered on the reference anchor HAPS 10A, all the plurality of HAPSs 10 are controlled so as to perform a cooperative flight with each other. As a result, all the HAPSs subject to the cooperative flight control in the area providing the communication service using the HAPSs 10 can perform the cooperative flight with each other, and it is possible to more reliably suppress a deterioration in communication quality due to frequent occurrence of handovers at cell boundaries and an increase of interference from an adjacent cell, in the communication-service providing area. It is noted that, the anchor HAPS 10A may be plural.

Figure 16:
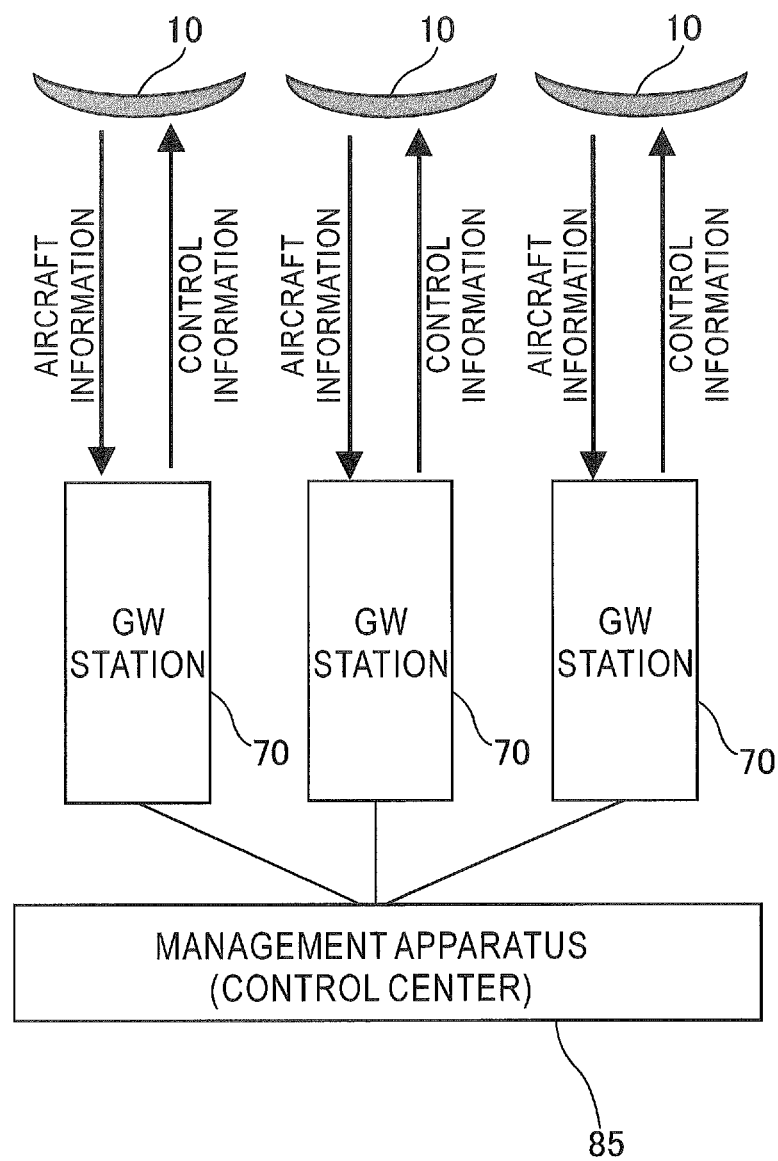
FIG. 16 is an illustration showing an example of a control system of a centralized control type capable of controlling a cooperative flight of HAPS according to the embodiment.

FIG. 16 is an illustration showing an example of a control system of a centralized control type capable of controlling a cooperative flight of the HAPS 10 according to the embodiment. In FIG. 16, the management apparatus 85 provided in the control center on the ground or on the sea receives information (for example, a latitude, a longitude, an altitude, a direction of flight direction, an inclination from horizontal plane) on the aircraft as above-mentioned monitoring information on each of the plurality of HAPSs 10 via the GW station (relay apparatus) 70 capable of communicating with each of the plurality of HAPSs 10. The management apparatus 85 aggregates and stores the information on the aircraft received from each HAPS 10, in a HAPS database as storage means. The management apparatus 85 generates or selects control information for performing the cooperative flight based on the information on the corresponding aircraft for each HAPS 10, and transmits the control information to the HAPS 10 via the GW station (relay apparatus) 70. Each HAPS 10 controls to perform the cooperative flight based on the received control information. As described above, in the example of FIG. 16, from the management apparatus 85 on the ground or on the sea, each HAPSs 10 can be centrally controlled so that all the plurality of HAPSs 10 perform the cooperative flight with each other.

Figure 17:
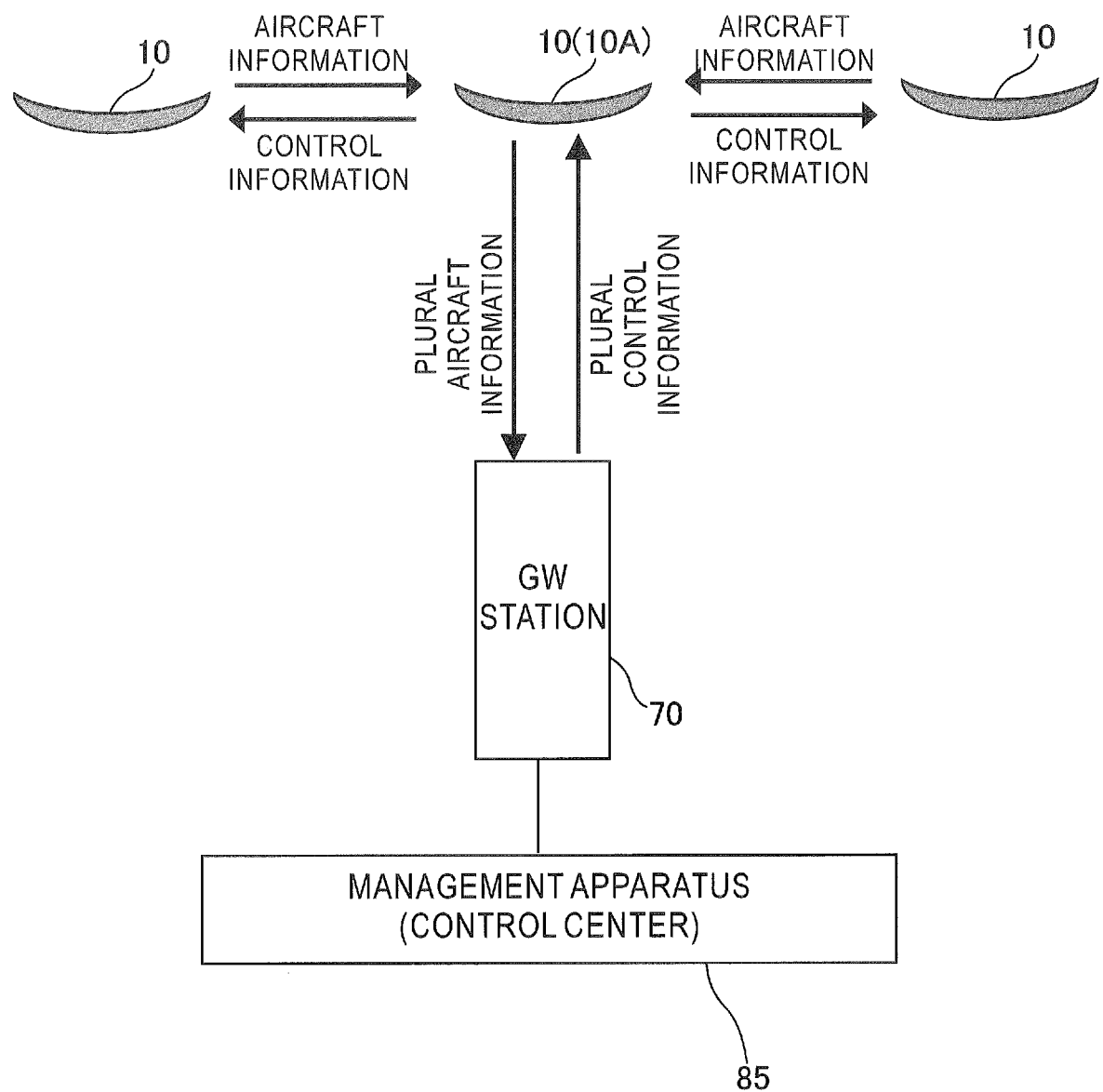
FIG. 17 is an illustration showing another example of a control system of a centralized control type capable of controlling a cooperative flight of HAPSs according to the embodiment.

FIG. 17 is an illustration showing another example of a control system of a centralized control type capable of controlling a cooperative flight of the HAPSs 10 according to the embodiment. In FIG. 17, the management apparatus 85 provided in the control center on the ground or on the sea receives information (for example, a latitude, a longitude, an altitude, a direction of flight direction, an inclination from horizontal plane) on all aircrafts of the plurality of HAPSs 10 via any one anchor HAPS 10A among the plurality of HAPSs 10. The management apparatus 85 aggregates and stores the information on all aircrafts of the plurality of HAPSs 10 received via the anchor HAPS 10A in the HAPS database. With respect to all the plurality of HAPSs 10, the management apparatus 85 generates or selects control information for performing the cooperative flight based on the information on the aircrafts, and transmits the plurality of control information to each HAPS 10 via the GW station (relay apparatus) 70 and the anchor HAPS 10A. Each HAPS 10 controls to perform the cooperative flight based on the received control information. As described above, in the example of FIG. 17, from the management apparatus 85 on the ground or on the sea, the HAPSs 10 can be centrally controlled so that all the plurality of HAPSs 10 perform the cooperative flight with each other. Particularly, in the example of FIG. 17, even when it is in a situation that any one of the plurality of HAPSs 10 cannot communicate with the GW station 70, the cooperative flight of the HAPSs 10 can be controlled. It is noted that, in the example of FIG. 17, each of the anchor HAPS 10A and the GW station 70, which are used for transmitting and receiving the information on the aircraft and the control information, may be plural.

Figure 18:
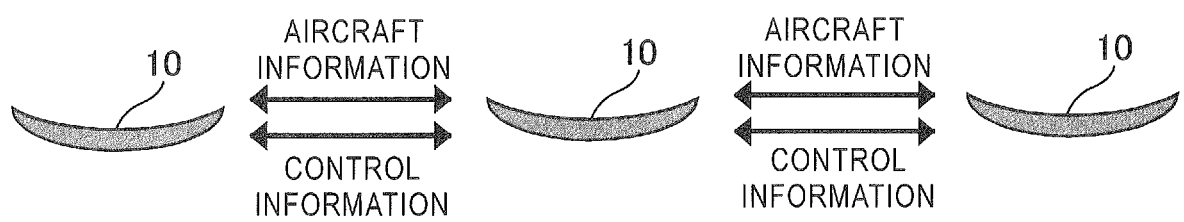
FIG. 18 is an illustration showing an example of a control system of autonomous control type capable of controlling a cooperative flight of HAPSs according to the embodiment.

FIG. 18 is an illustration showing an example of a control system of autonomous control type capable of controlling a cooperative flight of the HAPS 10 according to the embodiment. In FIG. 18, each of the plurality of HAPSs 10 exchanges information (for example, a latitude, a longitude, an altitude, a direction of flight direction, an inclination from horizontal plane) on the aircraft with the adjacent HAPS 10, generates or selects control information for performing the cooperative flight, and controls to perform the cooperative flight based on the control information. As described above, the plurality of HAPSs 10 in FIG. 18 can be autonomously controlled so that all the plurality of HAPSs 10 perform the cooperative flight with each other. Particularly, in the example of FIG. 18, even when all the plurality of HAPSs 10 cannot communicate with the GW station 70, the cooperative flights of the HAPSs 10 can be controlled.

It is noted that, the process steps and configuration elements of the radio relay station of the communication relay apparatus such as the HAPSs 10 and 20, the feeder station, the gateway station, the management apparatus, the monitoring apparatus, the remote control apparatus, the server, the terminal apparatus (user apparatus, mobile station, communication terminal), the base station and the base station apparatus described in the present description can be implemented with various means. For example, these process steps and configuration elements may be implemented with hardware, firmware, software, or a combination thereof.

With respect to hardware implementation, means such as processing units or the like used for establishing the foregoing steps and configuration elements in entities (for example, radio relay station, feeder station, gateway station, base station, base station apparatus, radio relay station apparatus, terminal apparatus (user apparatus, mobile station, communication terminal), management apparatus, monitoring apparatus, remote control apparatus, server, hard disk drive apparatus, or optical disk drive apparatus) may be implemented in one or more of an application-specific IC (ASIC), a digital signal processor (DSP), a digital signal processing apparatus (DSPD), a programmable logic device (PLD), a field programmable gate array (FPGA), a processor, a controller, a microcontroller, a microprocessor, a electronic device, other electronic unit, computer, or a combination thereof, which are designed so as to perform a function described in the present specification.

With respect to the firmware and/or software implementation, means such as processing units or the like used for establishing the foregoing configuration elements may be implemented with a program (for example, code such as procedure, function, module, instruction, etc.) for performing a function described in the present specification. In general, any computer/processor readable medium of materializing the code of firmware and/or software may be used for implementation of means such as processing units and so on for establishing the foregoing steps and configuration elements described in the present specification. For example, in a control apparatus, the firmware and/or software code may be stored in a memory and executed by a computer or processor. The memory may be implemented within the computer or processor, or outside the processor. Further, the firmware and/or software code may be stored in, for example, a medium capable being read by a computer or processor, such as a random-access memory (RAM), a read-only memory (ROM), a non-volatility random-access memory (NVRAM), a programmable read-only memory (PROM), an electrically erasable PROM (EEPROM), a FLASH memory, a floppy (registered trademark) disk, a compact disk (CD), a digital versatile disk (DVD), a magnetic or optical data storage unit, or the like. The code may be executed by one or more of computers and processors, and a certain aspect of functionalities described in the present specification may by executed by a computer or processor.

The medium may be a non-transitory recording medium. Further, the code of the program may be executable by being read by a computer, a processor, or another device or an apparatus machine, and the format is not limited to a specific format. For example, the code of the program may be any of a source code, an object code, and a binary code, and may be a mixture of two or more of those codes.

The description of embodiments disclosed in the present specification is provided so that the present disclosures can be produced or used by those skilled in the art. Various modifications of the present disclosures will be readily apparent to those skilled in the art and general principles defined in the present specification can be applied to other variations without departing from the spirit and scope of the present disclosures. Therefore, the present disclosures should not be limited to examples and designs described in the present specification and should be recognized to be in the broadest scope corresponding to principles and novel features disclosed in the present specification.

REFERENCE SIGNS LIST 10, 10(1) to 10(6) HAPS (solar-plane type)
10A anchor HAPS
10F(1) to 10F(6) flight route
20 HAPS (airship type)
40 cell-formation target airspace
41, 42, 43 three-dimensional cell
50 airspace where HAPS is located
60 drone
61 terminal apparatus
65 airplane
70 gateway station (GW station)
72 artificial satellite
80 mobile communication network
85 management apparatus (air traffic control center, control center)
86 server
90 base station (eNodeB)
100, 200, 300 beam
100A, 100A(1) to 100A(6) cell
110, 210 radio relay station
A, B SINR deterioration area

The invention claimed is:

1. A system comprising a plurality of radio relay apparatuses for performing a radio communication with a terminal apparatus, wherein each of the plurality of radio relay apparatuses:
is a solar-plane-type or airship-type floating object movably provided by flying in an upper airspace;
comprises a radio relay station for forming a cell toward the ground or the sea to perform a radio communication with a terminal apparatus located in the cell;
repeatedly flies in circulation along a same cyclic flight route while forming a three-dimensional cell in a direction inclined from a vertical direction by its own rolling of the radio relay apparatus, in cooperation with each other so as to maintain a positional relationship between the radio relay apparatuses by an autonomous control or external control; and
performs a cooperative flight so that a flight direction of the radio relay apparatus and an attitude with respect to the flight direction are the same among the radio relay apparatuses as each other.

2. The system according to claim 1,
wherein each of the plurality of radio relay apparatuses performs a cooperative flight so as to maintain a positional relationship between the radio relay apparatuses in a horizontal direction.

3. The system according to claim 1,
wherein each of the plurality of radio relay apparatuses performs a cooperative flight so as to maintain a positional relationship between the radio relay apparatuses in a height direction.

4. The system according to claim 1,
wherein, when a flight pattern of any one radio relay apparatus of the plurality of radio relay apparatuses changes, other radio relay apparatuses are controlled to fly in same flight pattern as the changed flight pattern of the any one radio relay apparatus.

5. The system according to claim 1,
wherein the plurality of radio relay apparatuses are classified into a plurality of groups corresponding to plural areas different from each other on the ground or on the sea based on a position of each radio relay apparatus; and
wherein the system controls a cooperative flight of the radio relay apparatuses for each group.

6. The system according to claim 1,
wherein the system sets any one radio relay apparatus of the plurality of radio relay apparatuses as a radio relay apparatus serving as a reference for controlling the flight, and
wherein the system controls all the plurality of radio relay apparatuses so as to perform a cooperative flight with each other centered on the reference radio relay apparatus.

7. The system according to claim 1,
wherein the system comprises a management apparatus for managing the plurality of radio relay apparatuses, and
wherein the management apparatus:
acquires information including a current position of each of the plurality of radio relay apparatuses, from each of the plurality of radio relay apparatuses via a gateway station on the ground or on the sea; and
transmits control information for performing the cooperative flight to each of the plurality of radio relay apparatuses via the gateway station based on the information on the radio relay apparatus.

8. The system according to claim 1,
wherein the system comprises a management apparatus for managing the plurality of radio relay apparatuses,
wherein any one radio relay apparatus of the plurality of radio relay apparatuses acquires information including a current position of each of other radio relay apparatuses, from the other radio relay apparatuses, and
wherein the management apparatus:
acquires information including at least one of a current position, an altitude, and an attitude of each of the plurality of radio relay apparatuses, from the any one radio relay apparatus via a gateway station on the ground or on the sea; and
transmits control information for performing the cooperative flight to the any one radio relay apparatus via the gateway station based on the information on the radio relay apparatus, and transmits to the other radio relay apparatuses via the gateway station and the any one radio relay apparatus.

9. The system according to claim 1,
wherein the radio relay apparatus acquires information including a current position of another radio relay apparatus located near the radio relay apparatus, from the another radio relay apparatus, and controls to fly in cooperation with the another radio relay apparatus based on the information on the radio relay apparatus.

10. A management apparatus for managing a plurality of radio relay apparatuses that performs a radio communication with a terminal apparatus,
wherein the management apparatus:
acquires information including a current position of each of the plurality of radio relay apparatuses that is a solar-plane-type or airship-type floating object movably provided by flying in an upper airspace and forms a cell toward the ground or the sea to perform a radio communication with a terminal apparatus located in the cell, from each of the plurality of radio relay apparatuses via a gateway station on the ground or on the sea; and
transmits control information for controlling so that the plurality of radio relay apparatuses repeatedly fly in circulation along a same cyclic flight route while forming a three-dimensional cell in a direction inclined from a vertical direction by its own rolling of the radio relay apparatus, in cooperation with each other so as to maintain a positional relationship between the radio relay apparatuses, and so that the plurality of radio relay apparatuses perform a cooperative flight so that a flight direction of the radio relay apparatus and an attitude with respect to the flight direction are the same among the radio relay apparatuses as each other, to each of the plurality of radio relay apparatuses via the gateway station, based on the information on the plurality of radio relay apparatuses.

11. A flight method of a plurality of radio relay apparatuses for performing a radio communication with a terminal apparatus,
wherein the plurality of radio relay apparatuses, which are solar-plane-type or airship-type floating objects movably provided by flying in an upper airspace and respectively form a cell toward the ground or the sea to perform a radio communication with a terminal apparatus located in the cell, fly in cooperation with each other so as to maintain a positional relationship between the radio relay apparatuses, and repeatedly perform a cooperative flight in circulation along a same cyclic flight route while forming a three-dimensional cell in a direction inclined from a vertical direction by its own rolling so that a flight direction of the radio relay apparatus and an attitude with respect to the flight direction are the same among the radio relay apparatuses as each other, by an autonomous control or external control.

12. A system comprising a plurality of radio relay apparatuses for performing a radio communication with a terminal apparatus,
wherein each of the plurality of radio relay apparatuses:
is a solar-plane-type or airship-type floating object movably provided by flying in an upper airspace;
comprises a radio relay station for forming a cell toward the ground or the sea to perform a radio communication with a terminal apparatus located in the cell; and
repeatedly flies in circulation along a same cyclic flight route while forming a three-dimensional cell in a direction inclined from a vertical direction by its own rolling of the radio relay apparatus, in cooperation with each other so as to maintain a positional relationship between the radio relay apparatuses by an autonomous control or external control, and
wherein, when a flight pattern of any one radio relay apparatus of the plurality of radio relay apparatuses changes, other radio relay apparatuses are controlled to fly in same flight pattern as the changed flight pattern of the any one radio relay apparatus.

13. The system according to claim 12,
wherein each of the plurality of radio relay apparatuses performs a cooperative flight so as to maintain a positional relationship between the radio relay apparatuses in a horizontal direction.

14. The system according to claim 12,
wherein each of the plurality of radio relay apparatuses performs a cooperative flight so as to maintain a positional relationship between the radio relay apparatuses in a height direction.

15. The system according to claim 12,
wherein the plurality of radio relay apparatuses are classified into a plurality of groups corresponding to plural areas different from each other on the ground or on the sea based on a position of each radio relay apparatus; and
wherein the system controls a cooperative flight of the radio relay apparatuses for each group.

16. The system according to claim 12,
wherein the system sets any one radio relay apparatus of the plurality of radio relay apparatuses as a radio relay apparatus serving as a reference for controlling the flight, and
wherein the system controls all the plurality of radio relay apparatuses so as to perform a cooperative flight with each other centered on the reference radio relay apparatus.

17. The system according to claim 12,
wherein the system comprises a management apparatus for managing the plurality of radio relay apparatuses, and
wherein the management apparatus:
acquires information including a current position of each of the plurality of radio relay apparatuses, from each of the plurality of radio relay apparatuses via a gateway station on the ground or on the sea; and
transmits control information for performing the cooperative flight to each of the plurality of radio relay apparatuses via the gateway station based on the information on the radio relay apparatus.

18. The system according to claim 12,
wherein the system comprises a management apparatus for managing the plurality of radio relay apparatuses,
wherein any one radio relay apparatus of the plurality of radio relay apparatuses acquires information including a current position of each of other radio relay apparatuses, from the other radio relay apparatuses, and
wherein the management apparatus:
acquires information including at least one of a current position, an altitude, and an attitude of each of the plurality of radio relay apparatuses, from the any one radio relay apparatus via a gateway station on the ground or on the sea; and
transmits control information for performing the cooperative flight to the any one radio relay apparatus via the gateway station based on the information on the radio relay apparatus, and transmits to the other radio relay apparatuses via the gateway station and the any one radio relay apparatus.

19. The system according to claim 12,
wherein the radio relay apparatus acquires information including a current position of another radio relay apparatus located near the radio relay apparatus, from the another radio relay apparatus, and controls to fly in cooperation with the another radio relay apparatus based on the information on the radio relay apparatus.

20. A management apparatus for managing a plurality of radio relay apparatuses that performs a radio communication with a terminal apparatus,
wherein the management apparatus:
acquires information including a current position of each of the plurality of radio relay apparatuses that is a solar-plane-type or airship-type floating object movably provided by flying in an upper airspace and forms a cell toward the ground or the sea to perform a radio communication with a terminal apparatus located in the cell, from each of the plurality of radio relay apparatuses via a gateway station on the ground or on the sea; and
transmits control information for controlling so that the plurality of radio relay apparatuses repeatedly fly in circulation along a same cyclic flight route while forming a three-dimensional cell in a direction inclined from a vertical direction by its own rolling of the radio relay apparatus, in cooperation with each other so as to maintain a positional relationship between the radio relay apparatuses, and so that, when a flight pattern of any one radio relay apparatus of the plurality of radio relay apparatuses changes, other radio relay apparatuses fly in same flight pattern as the changed flight pattern of the any one radio relay apparatus, to each of the plurality of radio relay apparatuses via the gateway station, based on the information on the plurality of radio relay apparatuses.

* * * * *